(12) United States Patent
Lee et al.

(10) Patent No.: US 12,273,828 B2
(45) Date of Patent: Apr. 8, 2025

(54) ELECTRONIC DEVICE PERFORMING RANDOM ACCESS PROCEDURE AND METHOD FOR OPERATING THEREOF

(71) Applicant: SAMSUNG ELECTRONICS CO., LTD., Suwon-si (KR)

(72) Inventors: Seongju Lee, Suwon-si (KR); Jaemoon Cha, Suwon-si (KR); Seonyun Kim, Suwon-si (KR); Yeonjoo Lee, Suwon-si (KR); Woohyuk Jang, Suwon-si (KR); Deunghyeon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 383 days.

(21) Appl. No.: 17/830,893

(22) Filed: Jun. 2, 2022

(65) Prior Publication Data

US 2022/0394633 A1    Dec. 8, 2022

Related U.S. Application Data

(63) Continuation of application No. PCT/KR2022/006451, filed on May 6, 2022.

(30) Foreign Application Priority Data

Jun. 3, 2021  (KR) .................. 10-2021-0072173
Aug. 5, 2021  (KR) .................. 10-2021-0103466

(51) Int. Cl.
*H04W 52/00*    (2009.01)
*H04B 1/3827*    (2015.01)
(Continued)

(52) U.S. Cl.
CPC ........ *H04W 52/367* (2013.01); *H04B 1/3838* (2013.01); *H04W 36/26* (2013.01); *H04W 74/0833* (2013.01)

(58) Field of Classification Search
CPC ............ H04B 1/3838; H04W 36/0085; H04W 36/26; H04W 52/325; H04W 52/367; H04W 52/50; H04W 74/0833
(Continued)

(56) References Cited

U.S. PATENT DOCUMENTS

2011/0319123 A1   12/2011   Kwun et al.
2012/0082099 A1*   4/2012   Bienas ................ H04W 74/002
                                                        370/329
(Continued)

FOREIGN PATENT DOCUMENTS

JP    2013-157827    8/2013
KR    10-2012-0001574    1/2012
(Continued)

OTHER PUBLICATIONS

Search Report dated Aug. 5, 2022 in counterpart International Patent Application PCT/KR2022/006451.
(Continued)

*Primary Examiner* — Md K Talukder
(74) *Attorney, Agent, or Firm* — Nixon & Vanderhye, P.C.

(57) ABSTRACT

According to various embodiments, an electronic device may include: at least one processor, wherein the at least one processor is configured to: receive at least one message causing a random access (RA) procedure for a second cell based on a second radio access technology (RAT) different from a first RAT while being connected to a first cell based on the first RAT, identify, based on the reception of the at least one message, a first accumulative specific absorption rate (SAR) having occurred based on transmission of at least one RF signal based on the first RAT and/or the second RAT for a first time interval, transmit an RA preamble message to the second cell based on determining, based on the first
(Continued)

accumulative SAR, that performing the RA procedure for the second cell based on the second RAT is possible, and refrain from transmitting the RA preamble message based on determining, based on the first accumulative SAR, that performing the RA procedure for the second cell based on the second RAT is impossible.

19 Claims, 28 Drawing Sheets

(51) Int. Cl.
*H04W 36/26* (2009.01)
*H04W 52/36* (2009.01)
*H04W 74/0833* (2024.01)

(58) Field of Classification Search
USPC .......................................................... 455/522
See application file for complete search history.

(56) References Cited

U.S. PATENT DOCUMENTS

| | | |
|---|---|---|
| 2012/0270592 A1 | 10/2012 | Ngai et al. |
| 2013/0035084 A1 | 2/2013 | Song et al. |
| 2013/0155884 A1 | 6/2013 | Wang et al. |
| 2014/0043498 A1* | 2/2014 | Lee ...................... H04N 23/61 348/222.1 |
| 2014/0199993 A1 | 7/2014 | Dhanda et al. |
| 2015/0003354 A1 | 1/2015 | Uchino et al. |
| 2016/0212770 A1 | 7/2016 | Lee et al. |
| 2017/0202053 A1* | 7/2017 | Rune ...................... H04W 76/25 |
| 2017/0353697 A1 | 12/2017 | Murakami |
| 2018/0007574 A1* | 1/2018 | Park ................... H04W 36/0085 |
| 2018/0076844 A1* | 3/2018 | Park .................... H04B 1/3838 |
| 2019/0174554 A1* | 6/2019 | Deenoo ................ H04L 5/0098 |
| 2021/0051599 A1 | 2/2021 | Cha et al. |
| 2021/0058104 A1* | 2/2021 | Hou ................... H04W 52/0261 |
| 2021/0250855 A1 | 8/2021 | Tang |
| 2021/0410210 A1* | 12/2021 | Lee ....................... H04W 48/16 |
| 2022/0132438 A1* | 4/2022 | Cha ..................... H04W 52/246 |
| 2022/0167225 A1* | 5/2022 | Kwak ................... H04W 36/00 |
| 2022/0167298 A1* | 5/2022 | Kang ................. H04W 36/0066 |
| 2023/0388842 A1* | 11/2023 | Kim ..................... H04B 17/328 |

FOREIGN PATENT DOCUMENTS

| | | |
|---|---|---|
| KR | 10-2013-0131469 | 12/2013 |
| KR | 10-2014-0043498 | 4/2014 |
| KR | 10-2015-0110617 | 10/2015 |
| KR | 10-2016-0059479 | 5/2016 |
| KR | 10-1701851 | 2/2017 |
| KR | 10-1973948 | 4/2019 |
| KR | 10-2021-0064243 | 6/2021 |
| WO | 2016/194310 | 12/2016 |

OTHER PUBLICATIONS

Written Opinion dated Aug. 5, 2022 in counterpart International Patent Application PCT/KR2022//006451.
3GPP TSG-RAN WG4 Meeting #86bis, R4-1804016, "Discussion on solutions to satisfy SAR requirements for NR HPUE," Apr. 5, 2018, 6 pages.

* cited by examiner

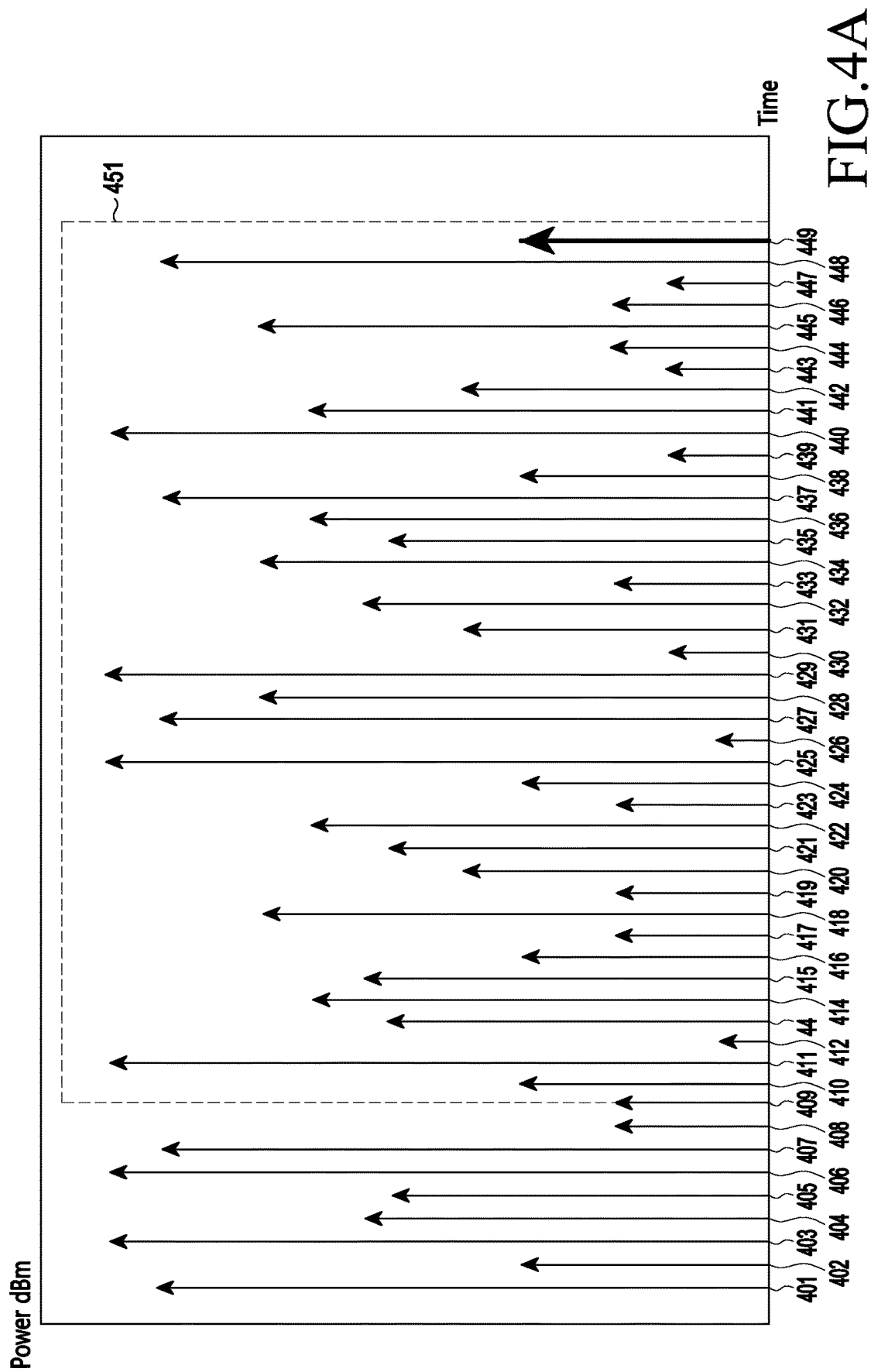

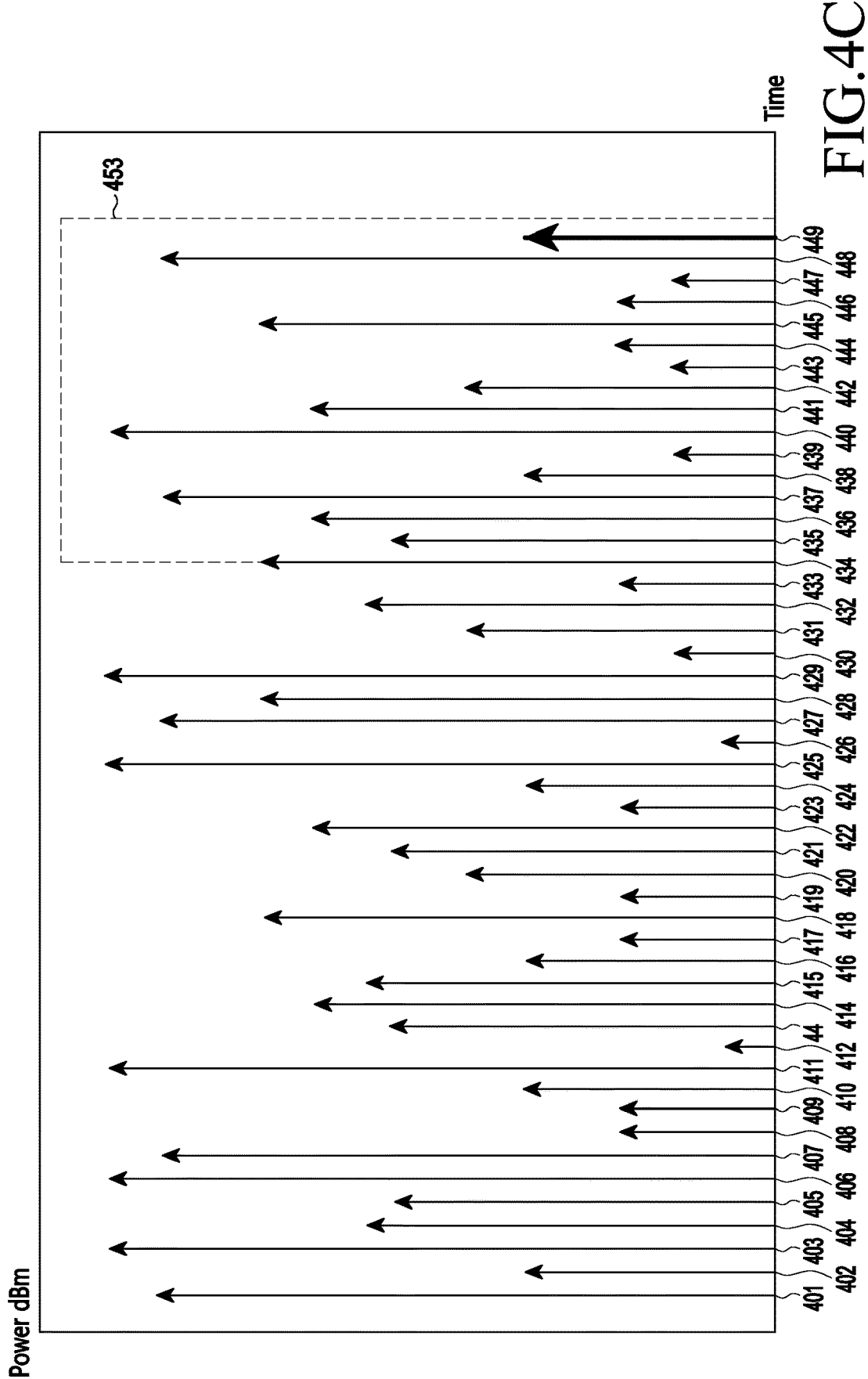

ELECTRONIC DEVICE PERFORMING RANDOM ACCESS PROCEDURE AND METHOD FOR OPERATING THEREOF

CROSS-REFERENCE TO RELATED APPLICATIONS

This application is a continuation of International Application No. PCT/KR2022/006451 designating the United States, filed on May 6, 2022, in the Korean Intellectual Property Receiving Office and claiming priority to Korean Patent Application No. 10-2021-0072173, filed on Jun. 3, 2021, in the Korean Intellectual Property Office, and to Korean Patent Application No. 10-2021-0103466, filed on Aug. 5, 2021, in the Korean Intellectual Property Office, the disclosures of all of which are incorporated by reference herein in their entireties.

BACKGROUND

Field

The disclosure relates to an electronic device for performing a random access (RA) procedure and an operation method thereof.

Description of Related Art

As a scheme for implementing 5G communication, a stand alone (SA) scheme and a non-stand alone (NSA) scheme have been considered. Among these schemes, the NSA scheme may include an E-UTRA NR dual connectivity (EN-DC) scheme using a new radio (NR) system together with a conventional LTE system. In the NSA scheme, a user terminal may use a gNB of a 5th generation system (5GS) as well as an eNB of an evolved packet system (EPS). A technology enabling a user terminal to use heterogeneous communication systems may be named dual connectivity. Dual connectivity was initially proposed by the 3rd generation partnership project (3GPP) release-12, and at the initially proposal time point, dual connectivity using a 3.5 GHz frequency band as a small cell rather than E-UTRA was proposed. The EN-DC scheme of 5G may use a node based on E-UTRA as a master node, and a node based on NR as a secondary node.

A user terminal may measure a measurement object (MO) based on an inter-RAT, for example, NR in order to add a secondary cell group (SCG) while being connected to a cell based on E-UTRA. A measurement configuration (e.g., at least one of a measurement object, a measurement identify, or a reporting configuration) associated with measurement of the inter-RAT may be configured based on the cell based on E-UTRA. Accordingly, the user terminal may measure the measurement object based on the inter-RAT, based on the measurement configuration. Moreover, the user terminal may measure the measurement object and/or perform a measurement report for a handover. The user terminal may perform an RA procedure when an SCG addition command or a handover command is received from a network in response to the measurement report.

A maximum value of transmission power of a user device may be backed off according to a specific absorption rate (SAR) limit. The user device may back off maximum transmission power of at least one physical channel in a case where an accumulative value of an SAR for a predetermined time interval exceeds an accumulative threshold value. In a case where an RA preamble is required to be transmitted as at least a part of an RA procedure, a maximum value of transmission power corresponding to a random access channel (RACH) may be backed off according to an SAR limit. When the transmission power of an RA preamble becomes relatively smaller, the possibility that the RA procedure fails may be high. Particularly, in a case where DC is in execution or is expected to be executed, when a maximum value of transmission power of an RF signal corresponding to an SCG among transmission powers of RF signals based on both RATs is backed off, the possibility of failure of the RA procedure may be high. In addition, in a case where DFT-s-OFDM is executed, the possibility of failure of the RA procedure may be further high. Even in a situation where the possibility of failure of an RA procedure is high, when the user device consistently performs the RA procedure, a waste of power and/or resources may occur unnecessarily.

According to an electronic device and an operation method thereof according to various embodiments, in a case where an RA procedure is required to be performed, whether to perform the RA procedure may be determined in consideration of an SAR that has previously occurred.

SUMMARY

According to various embodiments, an electronic device may include: at least one processor, wherein the at least one processor is configured to: receive at least one message causing a random access (RA) procedure for a second cell based on a second radio access technology (RAT) different from a first RAT while being connected to a first cell based on the first RAT; identify, based on the reception of the at least one message, a first accumulative specific absorption rate (SAR) having occurred based on transmission of at least one RF signal based on the first RAT and/or the second RAT for a first time interval; transmit an RA preamble message to the second cell based on determining, based on the first accumulative SAR, that performing the RA procedure for the second cell based on the second RAT is possible; and refrain from transmitting the RA preamble message based on determining, based on the first accumulative SAR, that performing the RA procedure for the second cell based on the second RAT is not possible.

According to various example embodiments, a method of operating an electronic device may include: receiving at least one message causing a random access (RA) procedure for a second cell based on a second radio access technology (RAT) different from a first RAT while being connected to a first cell based on the first RAT; identifying, based on the reception of the at least one message, a first accumulative specific absorption rate (SAR) having occurred based on transmission of at least one RF signal based on the first RAT and/or the second RAT for a first time interval; and transmitting an RA preamble message to the second cell based on determining, based on the first accumulative SAR, that performing the RA procedure for the second cell based on the second RAT is possible, wherein the RA preamble message is not transmitted based on determining, based on the first accumulative SAR, that performing the RA procedure for the second cell based on the second RAT is not possible.

According to various example embodiments, an electronic device may include: at least one processor, wherein the at least one processor is configured to: receive at least one radio resource control (RRC) reconfiguration message including a channel measurement configuration for a second radio access technology (RAT) different from a first RAT while being connected to a first cell based on the first RAT;

identify, based on the channel measurement configuration, a measurement object for the second RAT and a reporting criterion corresponding to the measurement object; identify a first accumulative specific absorption rate (SAR) having occurred based on transmission of at least one RF signal based on the first RAT and/or the second RAT for a first time interval; and determine, based on the first accumulative SAR, whether to perform a measurement of the measurement object and/or a report of a measurement result of the measurement object.

Various example embodiments may provide an electronic device and an operation method thereof, by which, in a case where an RA procedure is required to be performed, whether to perform the RA procedure may be determined in consideration of an SAR that has previously occurred. Accordingly, an unnecessary waste of power and/or resources which may occur when a user device consistently performs an RA procedure even in a situation where the possibility of failure of the RA procedure is high can be prevented and/or reduced.

BRIEF DESCRIPTION OF DRAWINGS

The above and other aspects, features and advantages of certain embodiments of the present disclosure will be more apparent from the following detailed description, taken in conjunction with the accompanying drawings, in which:

FIGS. 4A, 4B and 4C illustrate graphs of transmission power for each time according to various embodiments.

DETAILED DESCRIPTION

Figure 1:
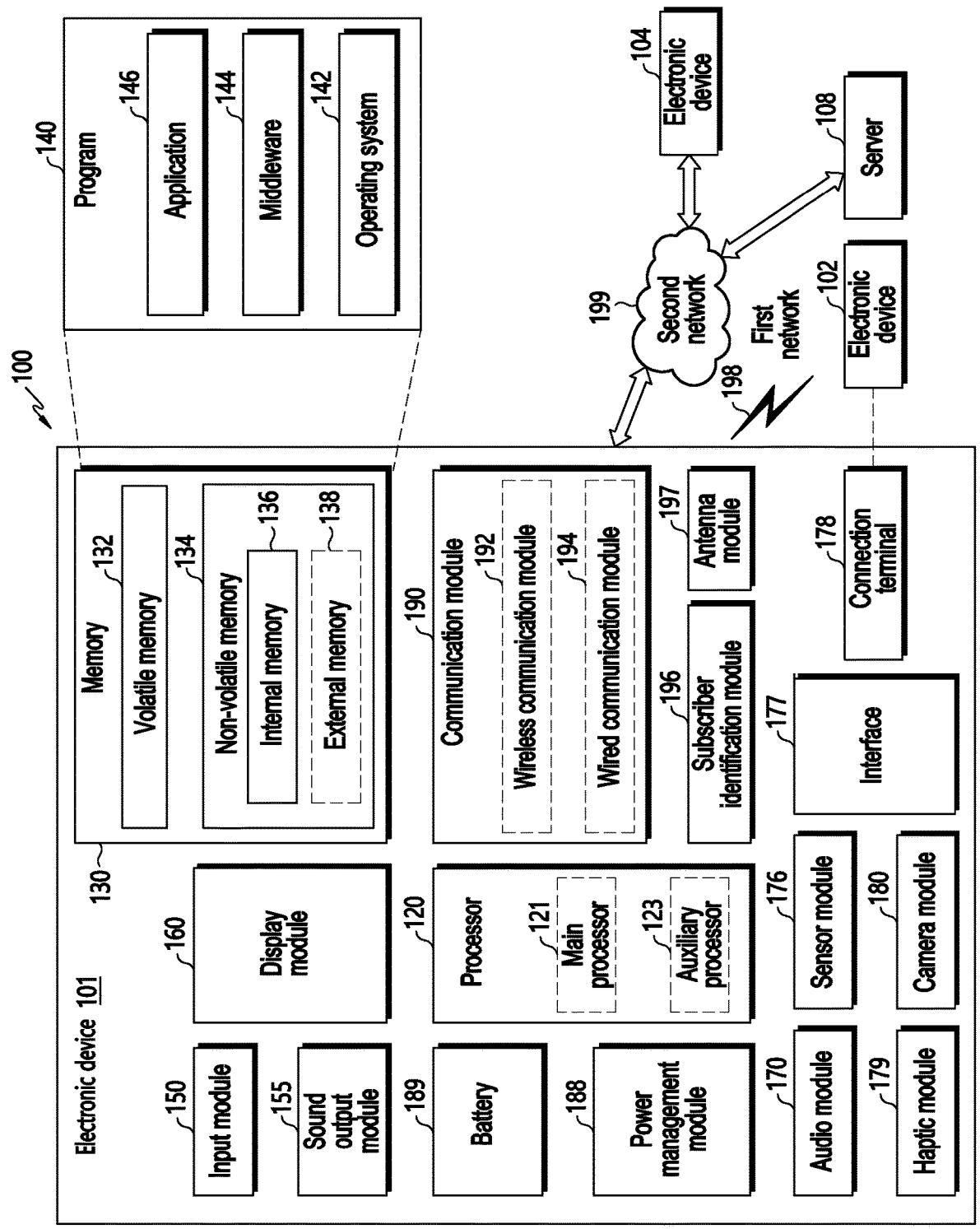
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
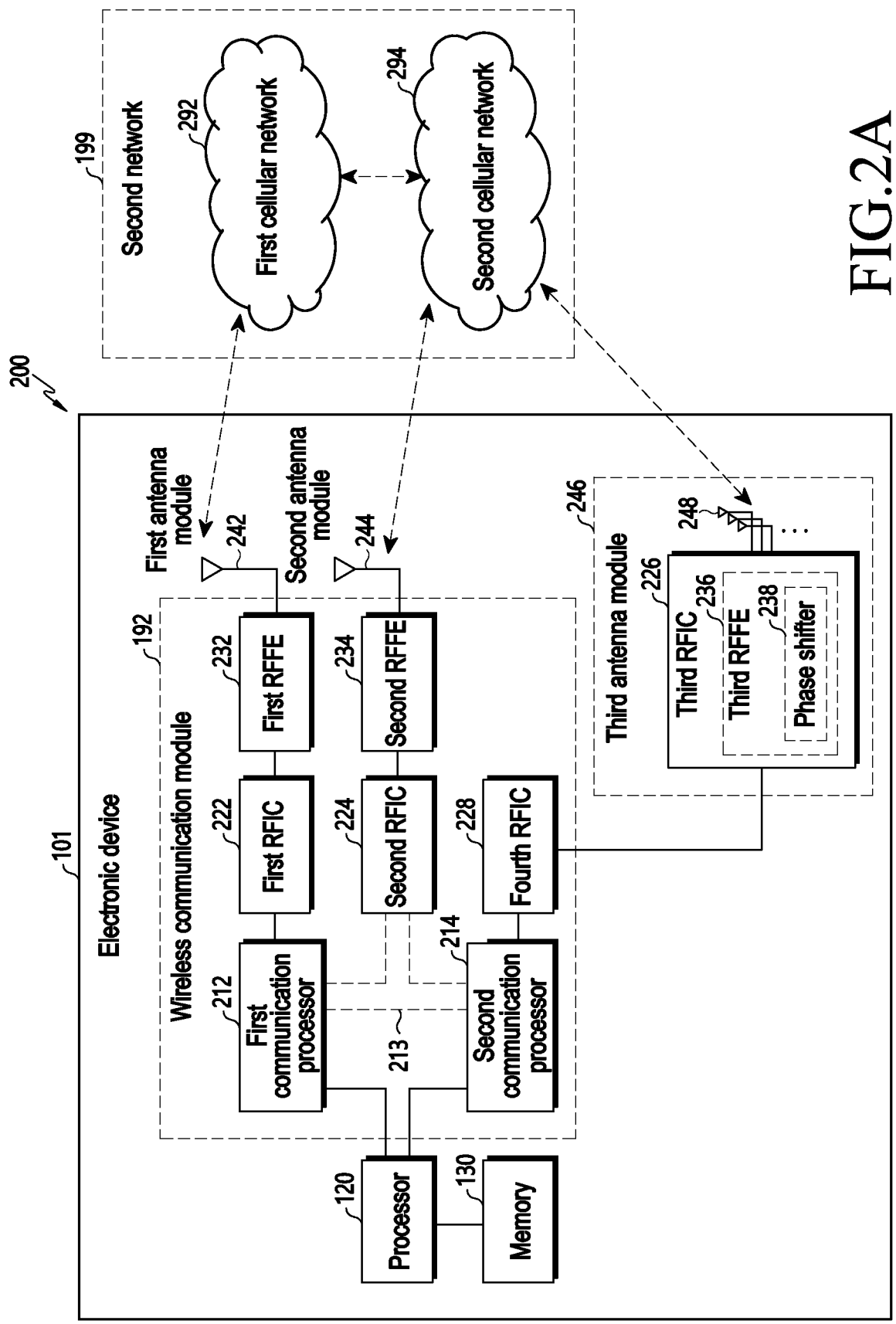
FIG. 2A is a block diagram of an electronic device for supporting legacy network communication and 5G network communication according to various embodiments.

FIG. 2A is a block diagram 200 of an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor (e.g., including processing circuitry) 120 and a memory 130. A second network 199 may include a first cellular network 292 and a second cellular network 294. According to an embodiment, the electronic device 101 may further include at least one component among the components illustrated in FIG. 1, and the second network 199 may further include at least another network. According to an embodiment, the first communication processor 212, the second communication processor 214, the first RFIC 222, the second RFIC 224, the fourth RFIC 228, the first RFFE 232, and the second RFFE 234 may configure at least a part of the wireless communication module 192. According to an embodiment, the fourth RFIC 228 may be omitted, or may be included as a part of the third RFIC 226.

The first communication processor 212 may include various processing circuitry and establish a communication channel within a band to be used for wireless communication with the first cellular network 292, and may support legacy network communication performed through the established communication channel. According to various embodiments, the first cellular network may be a legacy network including a second generation (2G), 3G, 4G, or long-term evolution (LTE) network. The second communication processor 214 may include various processing circuitry and establish a communication channel corresponding to a designated band (e.g., about 6 GHz-60 GHz) among bands to be used for wireless communication with the second cellular network 294, and may support 5G network communication performed through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or lower) among bands to be used for wireless communication with the second cellular network 294, and may support 5G network communication performed through the established communication channel.

The first communication processor 212 may transmit or receive data to or from the second communication processor 214. For example, data which has been classified to be transmitted through the second cellular network 294 may be changed to be transmitted through the first cellular network 292. In this case, the first communication processor 212 may receive transmission data from the second communication processor 214. For example, the first communication processor 212 may transmit or receive data to or from the second communication processor 214 through an interprocessor interface 213. The interprocessor interface 213 may be implemented as, for example, a universal asynchronous receiver/transmitter (UART) (e.g., a high speed-UART (HS-UART) or peripheral component interconnect bus express (PCIe) interface), but the type thereof is not limited. Alternatively, the first communication processor 212 and the second communication processor 214 may exchange control information and packet data information using, for example, a shared memory. The first communication processor 212 may transmit or receive, to or from the second communication processor 214, various information, such as sensing information, information on output strength, and resource block (RB) allocation information.

According to implementation, the first communication processor 212 may not be directly connected to the second communication processor 214. In this case, the first communication processor 212 may transmit or receive data to or from the second communication processor 214 through the processor 120 (e.g., an application processor). For example, the first communication processor 212 and the second communication processor 214 may transmit or receive data to or from each other through the processor 120 (e.g., an application processor) and an HS-UART interface or a PCIe interface, but the type of an interface is not limited. Alternatively, the first communication processor 212 and the second communication processor 214 may exchange control information and packet data information using the processor 120 (e.g., an application processor) and a shared memory.

Figure 2B:
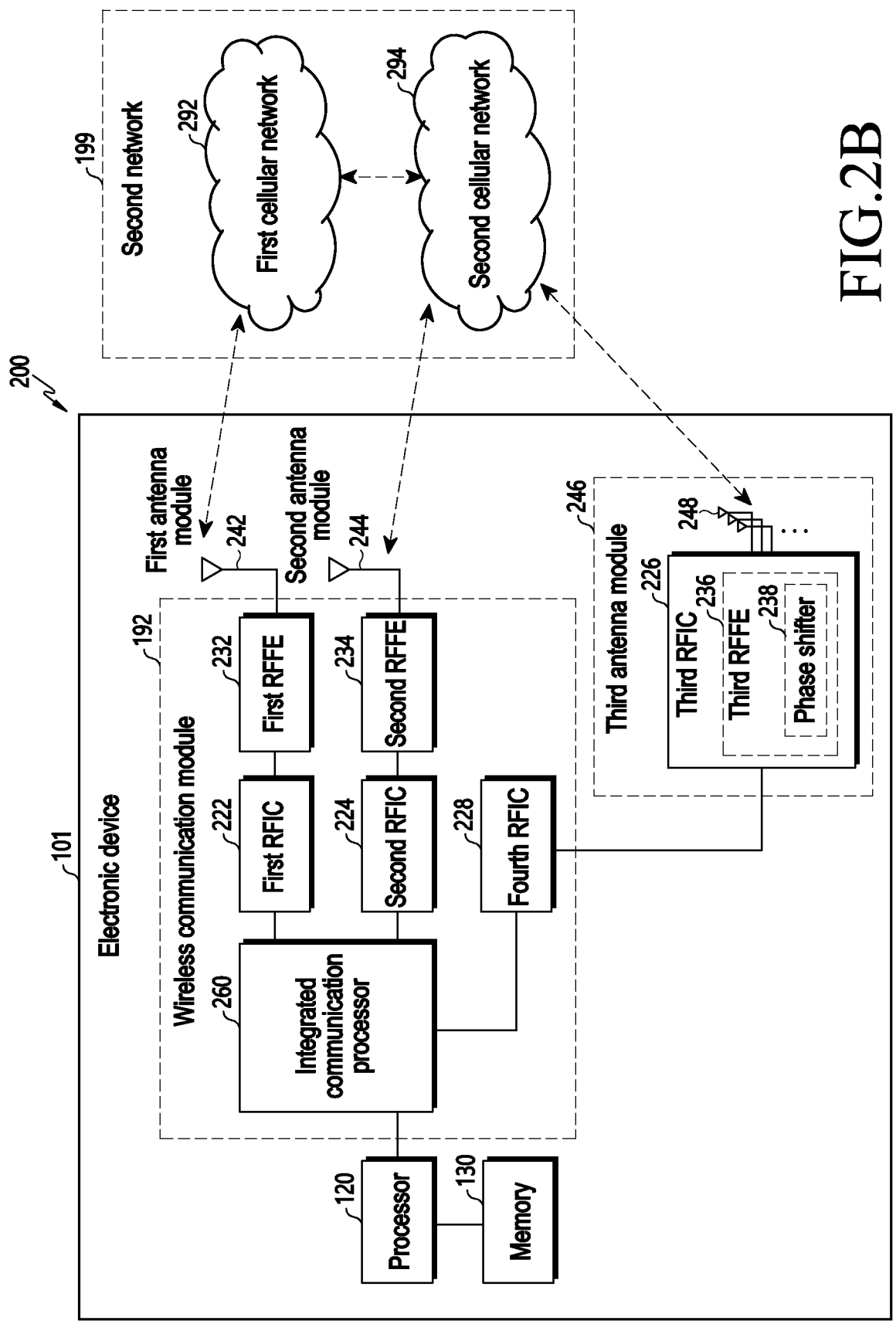
FIG. 2B is a block diagram of an electronic device for supporting legacy network communication and 5G network communication according to various embodiments.

According to an embodiment, the first communication processor 212 and the second communication processor 214 may be implemented in a single chip or a single package. According to various embodiments, the first communication processor 212 or the second communication processor 214 may be configured in a single chip or a single package together with the processor 120, the auxiliary processor 123, or the communication module 190. For example, as illustrated in FIG. 2B, a communication processor 260 may include various processing circuitry and support both a function for communication with the first cellular network 292 and a function for communication with the second cellular network 294.

The first RFIC 222 may convert, at the time of transmission, a baseband signal generated by the first communication processor 212 into a radio frequency (RF) signal having a frequency of about 700 MHz to about 3 GHz, which is used in the first cellular network 292 (e.g., a legacy network). At the time of reception, an RF signal may be obtained from the first network 292 (e.g., a legacy network) through an antenna (e.g., the first antenna module 242), and may be preprocessed through an RFFE (e.g., the first RFFE 232). The first RFIC 222 may convert a preprocessed RF signal into a baseband signal to enable the preprocessed RF signal to be processed by the first communication processor 212.

The second RFIC 224 may convert, at the time of transmission, a baseband signal generated by the first communication processor 212 or the second communication processor 214 into a RF signal (hereinafter, a 5G Sub6 RF signal) within a Sub6 band (e.g., about 6 GHz or lower) used in the second cellular network 294 (e.g., a 5G network). At the time of reception, a 5G Sub6 RF signal may be obtained from the second cellular network 294 (e.g., a 5G network) through an antenna (e.g., the second antenna module 244), and may be preprocessed through an RFFE (e.g., the second RFFE 234). The second RFIC 224 may convert a preprocessed 5G Sub6 RF signal into a baseband signal to enable the preprocessed 5G Sub6 RF signal to be processed by a corresponding communication processor among the first communication processor 212 or the second communication processor 214.

The third RFIC 226 may convert a baseband signal generated by the second communication processor 214 into a RF signal (hereinafter, a 5G Above6 RF signal) within a 5G Above6 band (e.g., about 6 GHz-about 60 GHz) to be used in the second cellular network 294 (e.g., a 5G network). At the time of reception, a 5G Above6 RF signal may be obtained from the second cellular network 294 (e.g., a 5G network) through an antenna (e.g., the antenna 248), and may be preprocessed through a third RFFE 236. The third RFIC 226 may convert a preprocessed 5G Above6 RF signal into a baseband signal to enable the preprocessed 5G Above6 RF signal to be processed by the second communication processor 214. According to an embodiment, the third RFFE 236 may be configured as a part of the third RFIC 226.

According to an embodiment, the electronic device 101 may include the fourth RFIC 228 separately from or at least a part of the third RFIC 226. In this case, the fourth RFIC 228 may convert a baseband signal generated by the second communication processor 214 into an RF signal (hereinafter, an IF signal) within an intermediate frequency band (e.g., about 9 GHz-11 GHz), and then transfer the IF signal to the third RFIC 226. The third RFIC 226 may convert an IF signal into a 5G Above6 RF signal. At the time of reception, a 5G Above6 RF signal may be received from the second cellular network 294 (e.g., a 5G network) through an antenna (e.g., the antenna 248), and may be converted into an IF signal by the third RFFE 226. The fourth RFIC 228 may convert an IF signal into a baseband signal to enable the IF signal to be processed by the second communication processor 214.

According to an embodiment, the first RFIC 222 and the second RFIC 224 may be implemented as at least a part of a single chip or a single package. According to various embodiments, as illustrated in FIG. 2A or FIG. 2B, when the first RFIC 222 and the second RFIC 224 are implemented as a single chip or a single package, the first RFIC and the second RFIC may be implemented as an integrated RFIC. In this case, the integrated RFIC may be connected to the first RFFE 232 and the second RFFE 234 to convert a baseband signal into a signal within a band supported by the first RFFE 232 and/or the second RFFE 234, and transmit the converted signal to one of the first RFFE 232 and the second RFFE 234. According to an embodiment, the first RFFE 232 and the second RFFE 234 may be implemented as at least a part of a single chip or a single package. According to an embodiment, at least one antenna module among the first antenna module 242 or the second antenna module 244 may be omitted or combined with another antenna module to process RF signals within multiple corresponding bands.

According to an embodiment, the third RFIC 226 and the antenna 248 may be arranged on the same substrate to configure the third antenna module 246. For example, the wireless communication module 192 or the processor 120 may be disposed on a first substrate (e.g., a main PCB). In this case, the third RFIC 226 may be disposed in a partial area (e.g., a lower surface) of a second substrate (e.g., a sub PCB) separate from the first substrate, and the antenna 248 may be disposed in another partial area (e.g., an upper surface), to configure the third antenna module 246. The length of a transmission line between the third RFIC 226 and the antenna 248 can be reduced by arranging the third RFIC and the antenna on the same substrate. Therefore, for example, loss (e.g., attenuation) of, by a transmission line, a signal within a high frequency band (e.g., about 6 GHz-about 60 GHz) used for 5G network communication can be reduced. Accordingly, the electronic device 101 can improve the quality or speed of communication with the second network 294 (e.g., a 5G network).

According to an embodiment, the antenna 248 may be configured to be an antenna array including multiple antenna elements which are usable for beamforming. In this case, the third RFIC 226 may include, for example, as a part of the third RFFE 236, multiple phase shifters 238 corresponding to the multiple antenna elements. At the time of transmission, each of the multiple phase shifters 238 may convert the phase of a 5G Above6 RF signal to be transmitted to an outside (e.g., a base station of a 5G network) of the electronic device 101 through a corresponding antenna element. At the time of reception, each of the multiple phase shifters 238 may convert, into an identical or a substantially identical phase, the phase of a 5G Above6 RF signal which has been received from the outside through a corresponding antenna element. This process enables transmission or reception through beamforming between the electronic device 101 and the outside.

The second cellular network 294 (e.g., a 5G network) may be operated independently to the first cellular network 292 (e.g., a legacy network) (e.g., stand-alone (SA), or may be operated while being connected thereto (e.g., non-stand-alone (NSA)). For example, there may be only an access network (e.g., a 5G radio access network (RAN) or a next generation RAN (NG RAN)) in a 5G network without a core network (e.g., a next generation core (NGC)). In this case, the electronic device 101 may access a access network of a 5G network, and then access an external network (e.g., Internet) under the control of a core network (e.g., an evolved packed core (EPC)) of a legacy network. Protocol information (e.g., LTE protocol information) for communication with a legacy network or protocol information (e.g., new radio (NR) protocol information) for communication with a 5G network may be stored in the memory 230, and may be accessed by another component (e.g., the processor 120, the first communication processor 212, or the second communication processor 214).

Figure 3A:
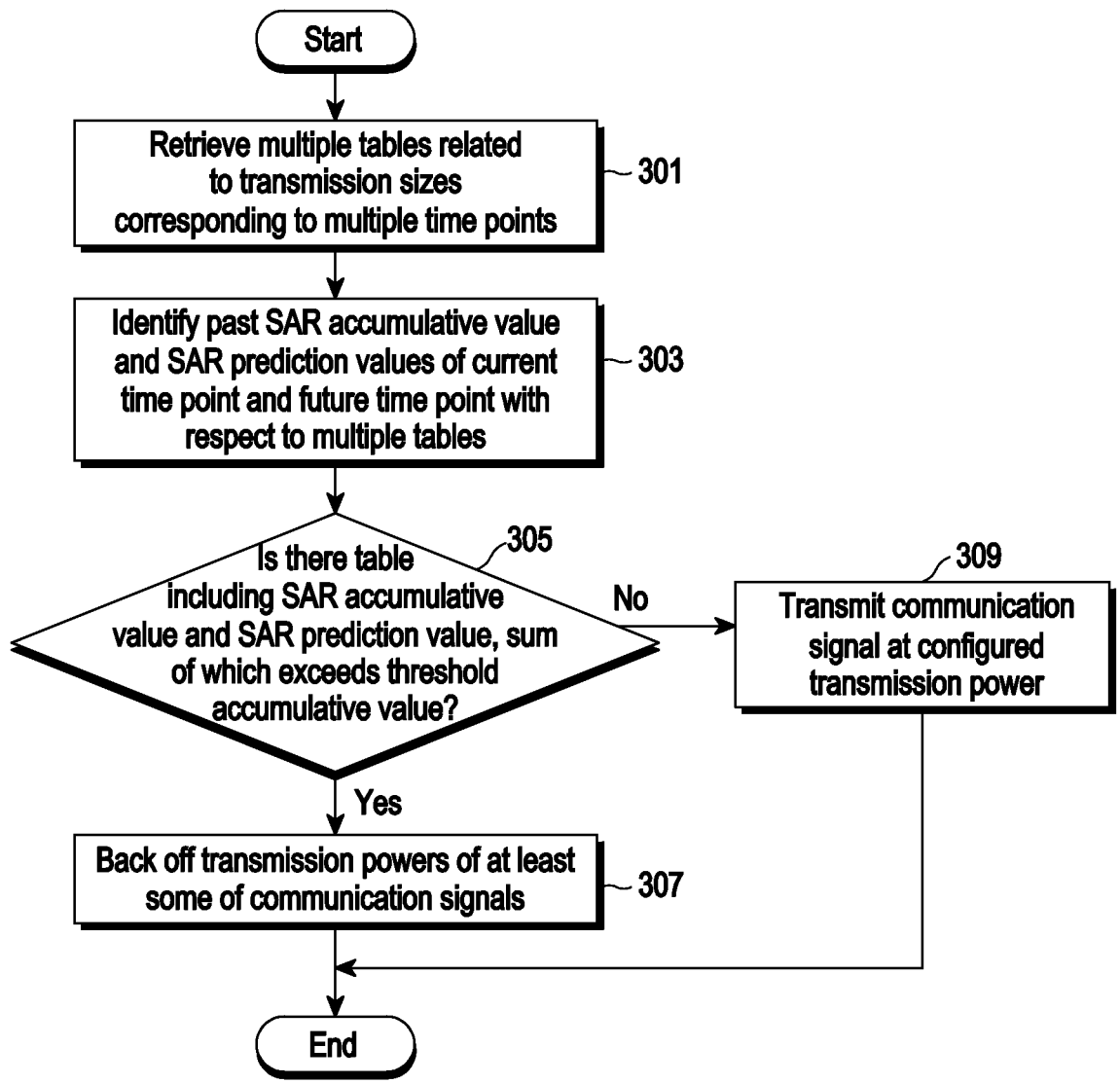
FIG. 3A is a flowchart illustrating an operation method of an electronic device according to various embodiments.
Figure 3B:
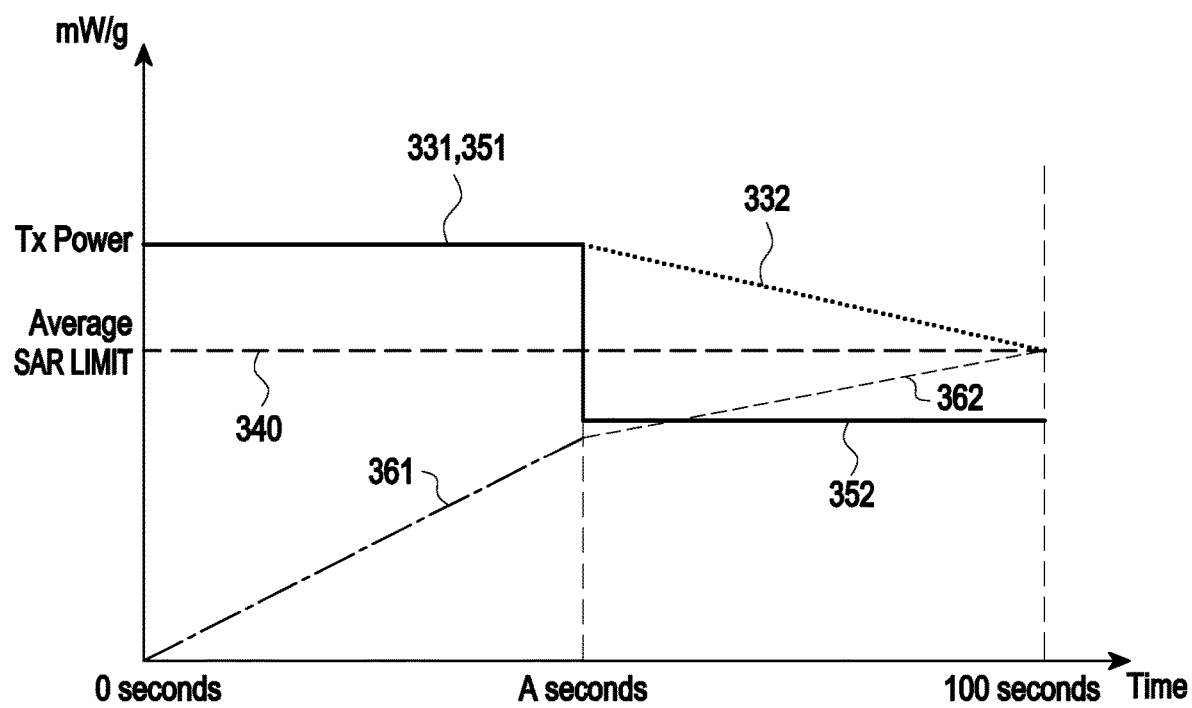
FIG. 3B is a diagram illustrating transmission power and an SAR over time according to various embodiments.
Figure 4B:
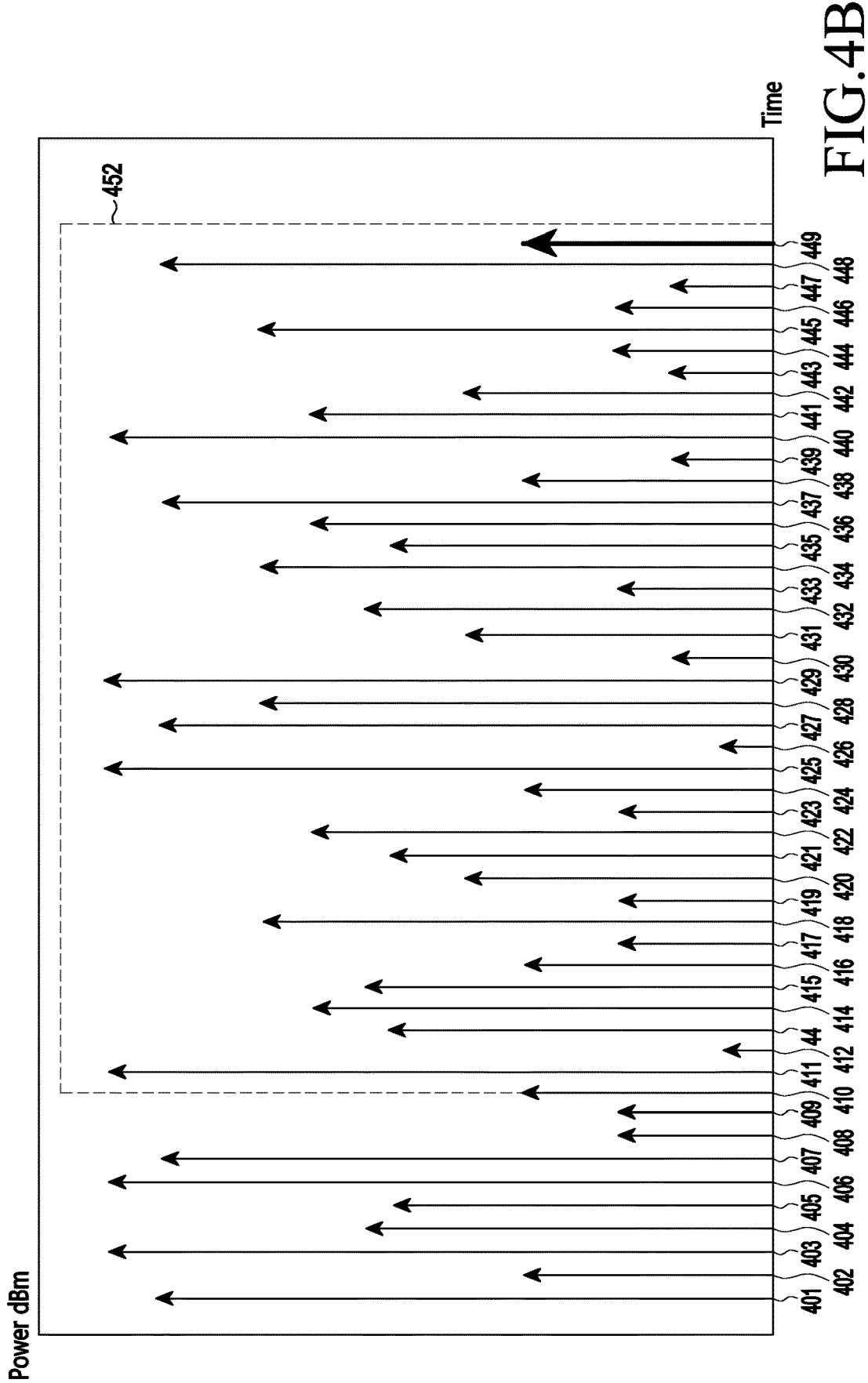
Figure 4D:
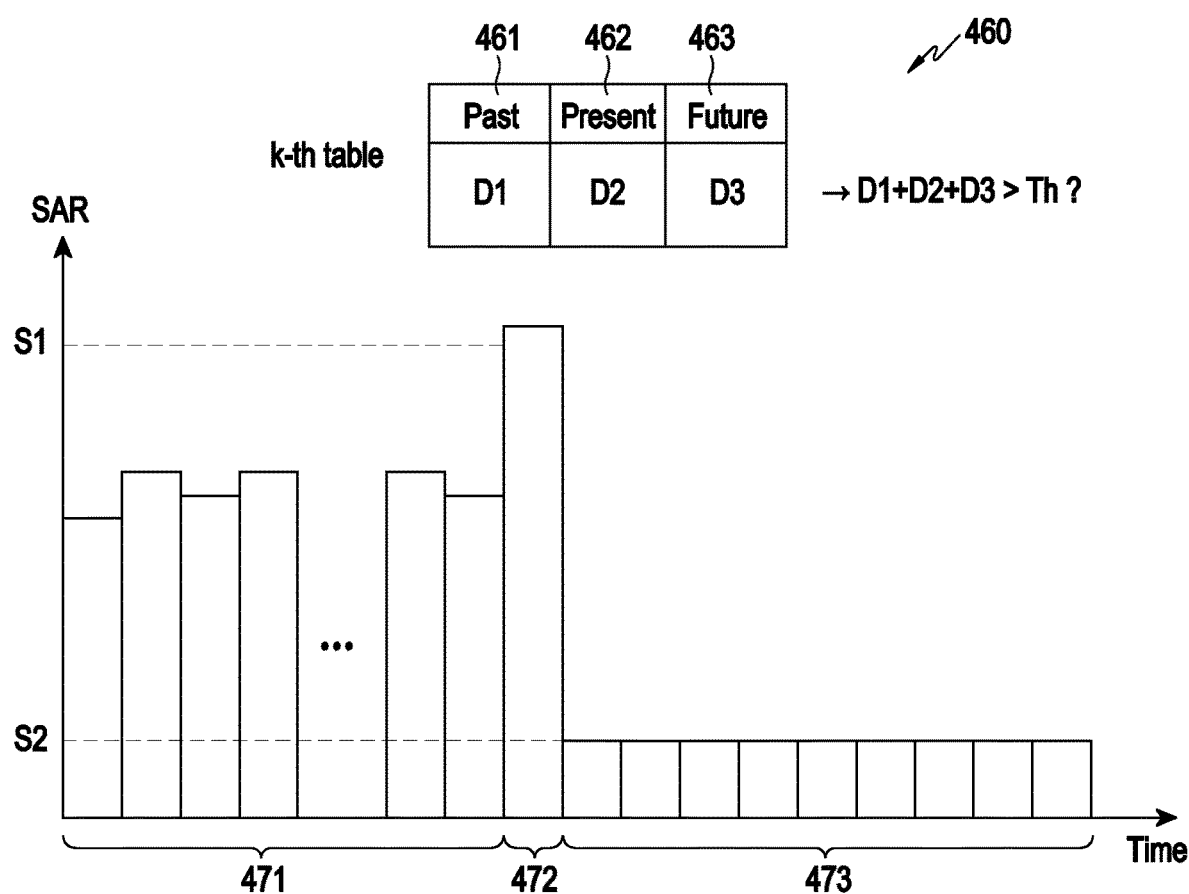
FIGS. 4D and 4E illustrate tables of transmission power for each time according to various embodiments.
Figure 4E:
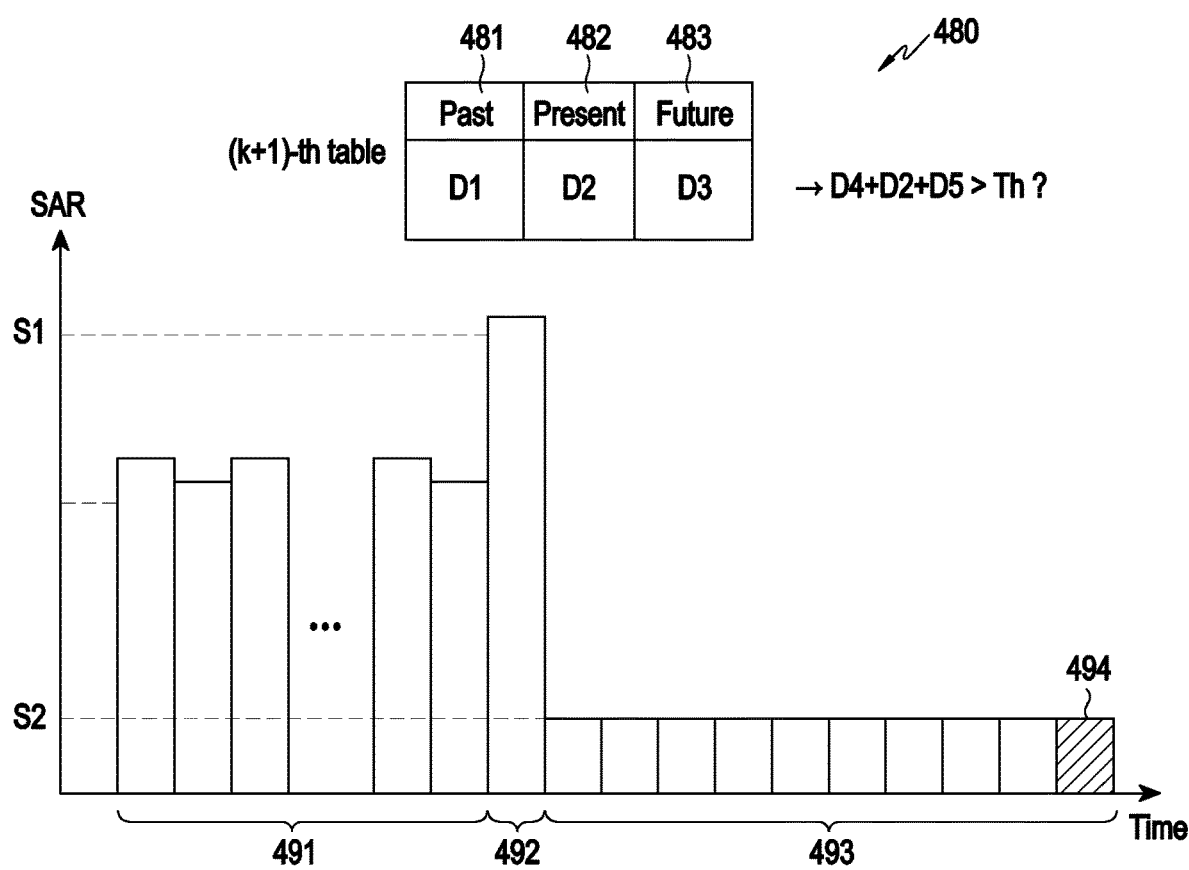

FIG. 3A is a flowchart illustrating an operation method of an electronic device according to various embodiments. An embodiment of FIG. 3A will be described with reference with FIG. 3B and FIGS. 4A, 4B, 4C, 4D and 4E. FIG. 3B is a diagram illustrating transmission power and an SAR over time according to various embodiments. FIGS. 4A, 4B and FIG. 4C illustrate graphs of transmission power for each time according to various embodiments. FIG. 4D and FIG. 4E illustrate tables of transmission power for each time according to various embodiments.

According to various embodiments, the electronic device 101 (e.g., at least one of the processor 120, the first communication processor 212, the second communication processor 214, or the integrated communication processor 260) may retrieve multiple tables related to transmission power corresponding to multiple time points in operation 301. Before explanation of an embodiment associated with FIG. 3A, terms as in Table 1 are defined.

TABLE 1

| | |
|---|---|
| a. | Normal MAX Power: A maximum transmission power of a case where there remains Margin of an SAR |
| b. | Normal Max SAR: The size of an SAR occurring at the time of operation at Normal MAX Power |
| c. | Backoff MAX Power: A maximum transmission power of a case where a backoff is performed due to lack of Margin of an SAR |
| d. | Backoff Max SAR: The size of an SAR occurring at the time of operation at Backoff MAX Power |
| e. | Measurement Time (T): A time interval for calculation of an accumulative SAR or calculation of an average of an SAR |
| f. | Measurement Period (P): A period (or a time interval) for calculation of an SAR |

TABLE 1-continued g. The number of tables for SAR calculation: T/P − 1
h. Average SAR LIMIT: A maximum value of an average SAR required to be not exceeded during T
i. Average Time (A_Time): A time for which an SAR is accumulatively measured
j. Accumulative SAR: The sum of SARs accumulated for Average Time
k. Max accumulative SAR: Average SAR LIMIT × Measurement Time
l. Average SAR: The size of an average SAR used for Average Time
m. Tx Room: Max accumulative SAR − Accumulative SAR, an SAR remaining after use
n. Remain Time (R_Time): The entire measurement time − time (A_Time) for which an SAR has been measured until the current time point First, for the description of the table, FIG. 4A to FIG. 4C are referred to. Referring to FIG. 4A, a graph including transmission power of multiple time points 401 to 449 is illustrated. An accumulative SAR (Accumulative SAR in Table 1) for a measurement time (Measurement Time in Table 1), for example, a measurement time including 50 time points may be required to maintain to be equal to or less than a maximum accumulative SAR (Max accumulative SAR in Table 1). The electronic device 101 may determine the transmission power of a communication signal to be transmitted at the current time point 449 to maintain, to be equal or less than the maximum accumulative SAR, an accumulative SAR for nine future time points (not illustrated) (e.g., Remain Time in Table 1) in addition to an accumulative SAR for the current time point 449 and the past random time points 409 to 448 (e.g., Average Time in Table 1). Moreover, the electronic device 101 may identify transmission powers 452, as illustrated in FIG. 4B, shifted by 1 time point from transmission powers 451 of the current time point 449 and the past random time points 409 to 448 illustrated in FIG. 4A. Being shifted by 1 time point may imply that data of the oldest time point (e.g., the time point 409 in FIG. 4A) is not reflected. The number of the transmission powers 452 of the current time point 449 and the past random time points 410 to 448 is 40, and may be less by 1 than 41, which is the number of the transmission powers 451 illustrated in FIG. 4A. The electronic device 101 may determine the transmission power of the current time point 449 to maintain, to be equal to or less than the maximum accumulative SAR, the sum of SARs predicted at 10 additional future time points and SARs caused by the transmission powers 452. As illustrated in FIG. 4C, the electronic device 101 may identify transmission powers 453 of the current time point 449 and the past random time points 434 to 448 which are shifted by 25 time points from the transmission powers 451. The number of the transmission powers 453 is 16, and may be less by 25 than 41, which is the number of the transmission powers 451 illustrated in FIG. 4A. The electronic device 101 may determine the transmission power of the current time point 449 to maintain, to be equal to or less than the maximum accumulative SAR, the sum of SARs predicted at 34 additional future time points and SARs caused by the transmission powers 453. Although not illustrated, the electronic device 101 may manage multiple graphs obtained through repeated shifts by 1 time point. A period for calculation of an SAR is a measurement period (P) in Table 1, and may be, for example, a gap between the transmission powers in FIG. 4A to FIG. 4C. The electronic device 101 may calculate and/or manage (T/P−1) tables with respect to a particular time point.

Hereinafter, a configuration of identifying an SAR prediction value will be described with reference to FIG. 4D and FIG. 4E.

Referring to FIG. 4D, the electronic device 101 may identify a k-th SAR table 460. The k-th SAR table 460 may include D1, which is an SAR accumulative value 461 of at least one past time point, a maximum SAR value 462 (D2) of the current time point, and an SAR prediction value 463 (D3) of at least one future time point. Referring to a graph, an SAR accumulative value corresponding to at least one past time point 461 may be D1. D1, which is the SAR accumulative value 461 of the at least one past time point, may be identified based on an antenna configuration. The number of the at least one past time point may be smaller by 1 than the number (e.g., 100) of all time points corresponding to a measurement time (e.g., 50 seconds) in a first table. N, which is the number (e.g., 100) of all time points, may be a result of dividing the measurement time by a sampling interval (or a shift interval). Accordingly, in the k-th table, the number of the at least one past time point may be smaller by k than the number of all time points. The electronic device 101 may identify D1, which is an SAR accumulative value of (N−K) past time points 471. The electronic device 101 may use an SAR maximum value S1 with respect to a current time point 472. The SAR maximum value S1 (e.g., normal max SAR in Table 1) may be an SAR value corresponding to a maximum transmission power (e.g., normal max power table 1) designated in the electronic device 101. In an embodiment, an SAR value of a time point immediately before the current time point 472 may be used with respect to the current time point 472. In an embodiment, an SAR average value of the past time points 471 before the current time point 472 may be used with respect to the current time point 472. The electronic device 101 may perform calculation for at least one future time point 473 using the sum of SAR values S2 (e.g., backoff max SAR in Table 1) for a backed-off transmission power (e.g., backoff max power in Table 1). The electronic device 101 may identify D3 as an accumulative SAR of the at least future time point 473. In the k-th table, the number of the at least one future time point may be k−1. Accordingly, the electronic device 101 may identify, in the k-th table, whether the total sum of SARs of N time points including (N−k) past time points, one current time point, and (k−1) future time points which is D1+D2+D3, exceeds an SAR maximum accumulative SAR. If it is identified that D1+D2+D3 exceeds the SAR maximum accumulative SAR, the electronic device 101 may back off the transmission power of the current time point. Referring to FIG. 4E, the electronic device 101 may also identify a (k+1)-th table 480, as illustrated in FIG. 4E. The electronic device 101 may identify, in the (k+1)-th table 480, D4 which is an SAR accumulative value 481 of at least one past time point, D2 which is a maximum SAR value 482 of the current time point 492, and D5 which is an SAR prediction value 483 of at least one future time point. The electronic device 101 may identify whether an SAR accumulative value of D4+D2+D5 exceeds a maximum accumulative SAR. In the (k+1)-th table, the number of the at least one past time point 491 may be less by 1 than the number of the at least one past time point 471 in the k-th table. In the (k+1)-th table, the number of the at least one future time point 493 may be greater by 1 (494) than the number of the at least one future time point 473 in the k-th table.

According to various embodiments, in operation 303, the electronic device 101 may identify a past SAR accumulative value, and SAR prediction values of the current time point and a future time point with respect to multiple tables corresponding to at least one future time point. The electronic device 101 may identify an SAR accumulative value with respect to a first table and the total of (N−1) tables shifted by i time point (i is equal to or greater than 1 and smaller than N−2) from the first table. In operation 305, the electronic device 101 may identify whether there is a table including an SAR accumulative value and an SAR prediction value, the sum of which exceeds a threshold value. If there is a table exceeding the threshold value (operation 305—YES), the electronic device 101 may back off one of transmission powers of at least some of communication signals in operation 307. If there is no table exceeding the threshold value (operation 305—NO), the electronic device 101 may transmit a communication signal at a configured transmission power in operation 309. Backoff of a maximum value of transmission power in various embodiments of the disclosure may indicate a backoff of a maximum value of transmission power.

As described above, the electronic device 101 may determine a maximum value of transmission power so that an average size of an SAR used for a measurement time does not exceed Average SAR limit. Alternatively, the electronic device 101 may determine a maximum value of transmission power so that an accumulative SAR for a measurement time does not exceed a Max accumulative SAR. The electronic device 101 may determine a maximum value of maximum power for a next time interval every P time. A condition of operation at normal max power for the next p time may be the same as follows.

Condition: Tx Room>an SAR (normal max SAR in Table 1) occurring at the time of operation at normal max power for next P+an SAR (backoff max SAR in Table 1) occurring at the time of operation at backoff max power for (Remain Time−P)=P×normal max SAR+(Remain Time−P)×backoff max SAR Tx Room in the condition may be a value obtained by subtracting a current accumulative SAR from a Max accumulative SAR. (Remain Time−P) in the condition may be T−average time−P, and for example, may be a future time point described above with reference to FIG. 4A to FIG. 4E. P may indicate the current time point. Average time may indicate a past time point. The condition being satisfied may imply that, even when the electronic device 101 configures a maximum transmission power of normal max power for P time, there is no table having an accumulative SAR exceeding a Max accumulative SAR. The condition not being satisfied may imply that, if the electronic device 101 configures a maximum transmission power of normal max power for P time, there is a possibility that there is a table having an accumulative SAR exceeding a Max accumulative SAR, and the electronic device 101 may configure backoff max power as a maximum transmission power for P time.

Table 2 shows an example of variables and conditions.

TABLE 2

[Example of variable configuration]

| | |
|---|---|
| i. | Normal MAX Power: 23 dBm |
| ii. | Backoff MAX Power: 20 dBm |
| iii. | Measurement Time (T): 100 seconds |
| iv. | Measurement Period (P): 0.5 seconds |
| v. | The number of SAR Calculator tables: 199 |
| vi. | Average SAR LIMIT: 1.5 mW/g |
| vii. | Max accumulative SAR: 150 mW/g |
| viii. | Normal Max SAR => SAR: 2 mW/g at 23 dBm |
| ix. | Backoff Max SAR => SAR: 1 mW/g at 20 dBm |

[Time point when maximum power is switched from normal max power to backoff max power]
Average time × normal max power + (100 − average time) × backoff max power <= a time point of satisfying an accumulative max SAR = Average time × 2 mW/g + (100 − average time) × 1 mW/g <= 150 mW/g <=> Average time <=50

In the example in Table 2, it is described that normal max power can be consistently used as maximum transmission power for 50 seconds, and a backoff to backoff max power after 50 seconds is required. For example, a case of transmitting an RF signal for 50 seconds at 23 dBm, which is normal max power, also transmitting an RF signal for next P (0.5 seconds) at 23 dBm, which is normal max power, and transmitting an RF signal for 49.5 seconds, which is (Remain time−P), at 20 dBm, which is backoff max power is employed. Tx Room may be 50 mW/g, which is 150 mW/g−50×2 mW/g. The occurrence of an SAR for P time may be 1 mW/g, which is 2 mW/g×0.5 seconds. The occurrence of an SAR for (Remain time−P) may be 49.5 mW/g, which is 49.5 seconds×1 mW/g. It may be noted that an accumulative SAR for P and (Remain time−P) is 50.5 mW/g which exceeds Tx room, and eventually, a backoff of a maximum value of transmission power is required at a P time point. The above example will be described with reference to FIG. 3B used for explanation of transmission power associated with one RAT. For example, referring to FIG. 3B, it may be noted that maximum transmission power may be configured to be a normal max power 351 up to A seconds (e.g., 50 seconds), but is backed off to a backoff max power 352 after A seconds. The inclination of a second part 362 of an accumulative SAR may be less than the inclination of a first part 361 of the accumulative SAR according to a backoff of a maximum value of the maximum transmission power. It may be noted that an average SAR 331 before A seconds exceeds an average SAR limit 340, but an average SAR 332 is the same as the average SAR limit 340 according to a backoff at a time point of being 100 seconds.

A case where the electronic device 101 is to transmit RF signals related to two or more RATs may occur, and this case will be described in greater detail below. For example, the electronic device 101 may transmit a first RF signal based on E-UTRA and a second RF signal based on NR according to EN-DC. The electronic device 101 may back off a maximum value of transmission power of an RF signal so that an accumulative SAR does not exceed an accumulative max SAR. The electronic device 101 may configure a priority of an RAT to be backed off. For example, the electronic device 101 may be configured to preferentially back off the transmission power of an RF signal based on NR, which is an RAT corresponding to an SCG, than E-UTRA, which is an RAT corresponding to an MCG. EN-DC corresponds to an example, and in a case of NE-DC, the electronic device 101 may be configured to preferentially back off a maximum value of transmission power of an RF signal based on E-UTRA. A case of preferentially backing off a maximum value of transmission power of an RF signal based on an SCG in DC also corresponds to an example, and there is no limit to the priority of backoff.

Figure 5:
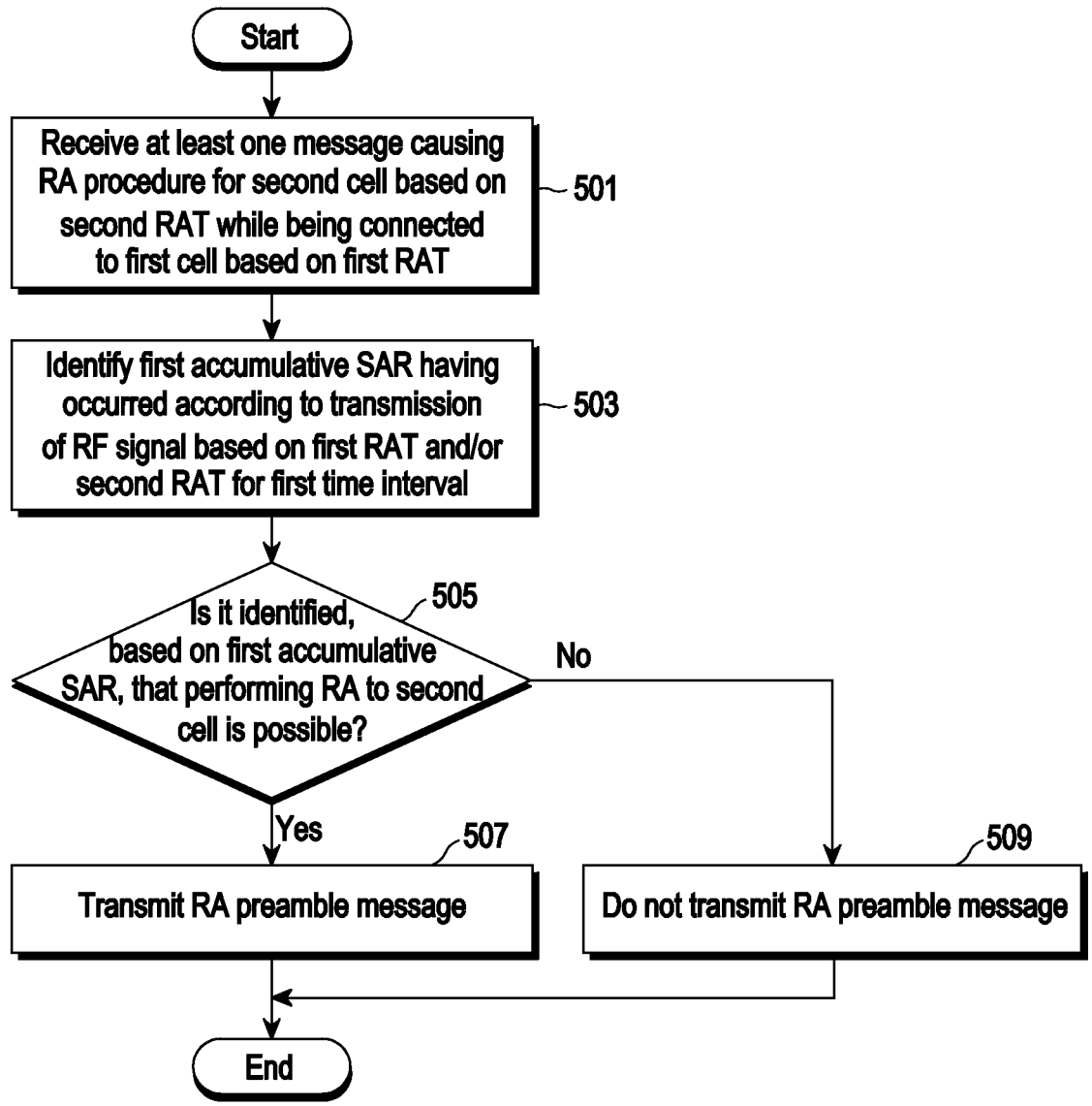
FIG. 5 is a flowchart illustrating an operation method of an electronic device according to various embodiments.

FIG. 5 is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may receive at least one message causing an RA procedure for a second cell based on a second RAT while being connected to a first cell based on a first RAT in operation 501. In one example, the electronic device 101 may receive an RRC reconfiguration message of an SCG addition configuration for NR, which is the second RAT (e.g., an RRC connection reconfiguration message based on $3^{rd}$ generation partnership project (3GPP) technical specification (TS) 36.331, or an RRC reconfiguration message based on 38.331) while being connected to the first cell based on E-UTRA, which is the first RAT. According to 3GPP, the electronic device 101 is proposed to perform an RA procedure for the second cell which is an SCG, based on the reception of the RRC reconfiguration message. The RA procedure may include, for example, transmission and/or reception of message 1 (e.g., an RA preamble message), message 2, message 3, and message 4, but is not limited thereto. As another example, the electronic device 101 may be connected to the first cell based on the first RAT and the second cell based on the second RAT by DC. The electronic device 101 may receive a handover command message (or an RRC reconfiguration message of an SpCell change configuration) for the second cell based on the second RAT.

According to various embodiments, the electronic device 101 may, in operation 503, identify a first accumulative SAR having occurred according to transmission of an RF signal based on the first RAT and/or the second RAT for a first time interval, based on the reception of the at least one message. If the electronic device 101 transmits only an RF signal based on the first RAT before the reception of the message, the electronic device 101 may identify the first accumulative SAR based on the first RAT. If the electronic device 101 transmits an RF signal based on the first RAT and an RF signal based on the second RAT before the reception of the message, the electronic device 101 may identify the first accumulative SAR which is the sum of an accumulative SAR based on the first RAT and an accumulative SAR based on the second RAT. The electronic device 101 may identify at least a part of the multiple tables, and may identify, for example, accumulative SARs with respect to each of all the tables.

Although operation 503 is performed after operation 501 in FIG. 5, this merely corresponds to an example. Operation 503 may be performed before operation 501, and a person skilled in the art may understand that the order of the performance is not limited to a flowchart according to various embodiments of the disclosure.

According to various embodiments, the electronic device 101 may determine whether performing an RA to the second cell is possible, based on the first accumulative SAR in operation 505. If it is determined that performing an RA to the second cell is possible (operation 505—YES), the electronic device 101 may transmit an RA preamble message in operation 507. If it is determined that performing an RA to the second cell is impossible (operation 505—NO), the electronic device 101 may refrain from transmit an RA preamble message in operation 509. For example, the electronic device 101 may not attempt an RA procedure. For example, the electronic device 101 may determine whether performing an RA to the second cell is possible, based on each of multiple first accumulative SARs with respect to all the tables. For example, if it is determined that performing an RA to the second cell is impossible for any one table among the multiple tables, the electronic device may refrain from transmit an RA preamble. For example, if it is determined that performing an RA to the second cell is possible for all the multiple tables, the electronic device 101 may transmit an RA preamble.

For example, the electronic device 101 may identify, based on the first accumulative SAR, a maximum value of transmission power of an RF signal based on the second RAT and/or whether the transmission of the RF signal is possible. The electronic device 101 may determine whether performing an RA is possible, based on the maximum value of transmission power of an RF signal based on the second RAT and/or whether the transmission of the RF signal is possible. For example, in a case where the transmission power of the RF signal based on the second RAT is not enough, the electronic device 101 may determine that performing an RA is impossible, and this will be described in greater detail below. For example, in a case where the transmission of the RF signal based on the second RAT is impossible, the electronic device 101 may determine that performing an RA is impossible, and this will be described in greater detail below. In a case where a relatively large accumulative SAR has occurred before reception of the message causing an RA procedure, the maximum value of transmission power of the RF signal based on the second RAT may be determined to have a relatively small size, or the transmission of the RF signal based on the second RAT may be determined to be impossible. According to a comparative example, the electronic device 101 may stop attempting to perform an RA procedure continuously after designated number of attempts of the RA procedure (e.g., 10 times). Contrary to the comparative example, when it is determined that performing the RA is impossible, the electronic device 101 according to various embodiments may not attempt an RA procedure independently to an existing number of attempts of the RA procedure.

In an embodiment, the electronic device 101 may preferentially attempt an RA procedure when the at least one message is received. When designated number (e.g., one time) of failures of an RA procedure is detected, whether to consistently attempting the RA procedure or stop attempting the RA procedure may be determined based on an accumulative SAR.

Figure 6A:
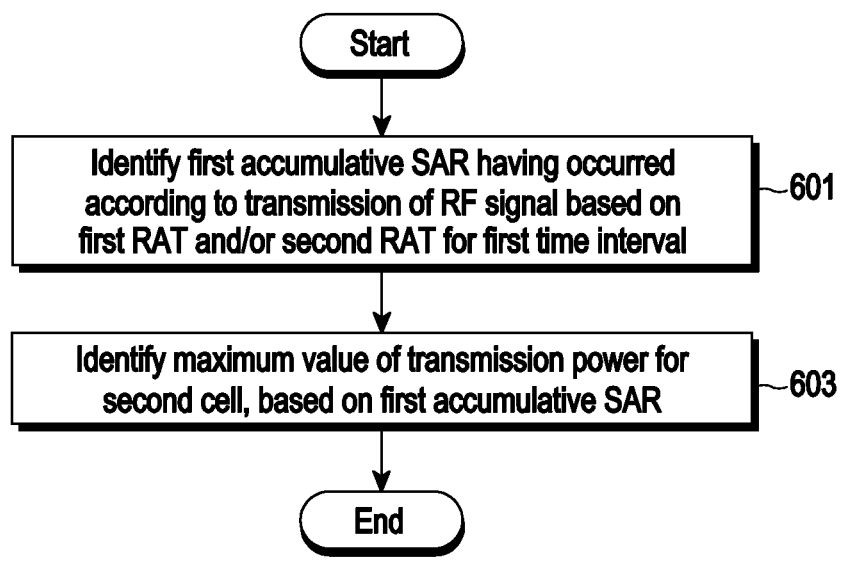
FIG. 6A is a flowchart illustrating an operation method of an electronic device according to various embodiments.

FIG. 6A is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may, in operation 601, identify a first accumulative SAR having occurred according to transmission of an RF uplink signal based on a first RAT and/or a second RAT for a first time interval. A method of identifying, by the electronic device 101, accumulative SARs for different past time intervals for each of multiple tables has been described above with reference to FIG. 4A to FIG. 4C, and thus a detailed description thereof will be omitted here. As described above, the electronic device 101 may identify an accumulative SAR according to transmission of an uplink signal based on the first RAT, or an accumulative SAR according to transmission of an RF signal based on DC between the first RAT and the second RAT. The electronic device 101 may identify a maximum value of transmission power for a second cell, based on the first accumulative SAR in operation 603. For example, a case where the electronic device 101 uses, based on EN-DC, a first cell as an MCG and a second cell as an SCG is employed. The first cell may be based on an E-UTRA RAT, and the second cell may be based on an NR RAT. The electronic device 101 may configure a priority of E-UTRA corresponding to an MCG to be higher than a priority of NR corresponding to an SCG. For example, a Max average SAR limit (hereinafter, E-UTRA Max average SAR limit) for E-UTRA and a max average SAR limit (hereinafter, NR Max average SAR limit) for NR may be configured to be different, and an order of backing off a maximum value of transmission power of one RAT may be determined accordingly. When the NR max average SAR limit is less than the E-UTRA Max average SAR limit, transmission power based on NR may be backed off earlier than transmission power based on E-UTRA. For example, a Max average SAR limit for EN-DC may be configured to be 1.5 mW/g, a E-UTRA max average SAR limit may be configured to be 1.5 mW/g, and an NR max average SAR limit may be configured to be 1.3 mW/g. For example, the electronic device 101 may configure a transmission power corresponding to an SAR limit for each RAT. The electronic device 101 may configure a power value corresponding to the SAR limit according to a frequency band of each RAT. For example, the electronic device 101 may configure 22 dBm as a transmission power corresponding to 1.5 mW/g for a B7 band. For example, the electronic device 101 may configure a transmission power corresponding to 1.3 mW/g in a case of NR. In another example, the electronic device 101 may configure a transmission power corresponding to NR to be a transmission power corresponding to 1.5 mW/g identically to E-UTRA, and calculate a power corresponding to 1.3 mW/g from a value of 1.5 mW/g. In an example, the electronic device 101 may multiply 1.5 mW/g by 13/15 to obtain 1.3 mW/g, and 13/15 may be a value configured for preferential backoff of NR. For example, a transmission power corresponding to 1.5 mW/g for a N7 band may be designated to be 22 dBm, and a transmission power corresponding to 1.3 mW/g may be calculated to be about 21.38 dBm.

Accordingly, in a case where a backoff of a maximum value of transmission power of an RF signal is required based on an accumulative SAR, the electronic device 101 may back off a maximum value of transmission power of an RF signal based on NR first. The electronic device 101 may determine whether to back off the maximum value of transmission power of the RF signal based on NR, based on the accumulative SAR. If a backoff of the maximum value of transmission power of the RF signal based on NR is not required, the electronic device 101 may determine normal max power configured for NR as a maximum transmission power. If a backoff of the maximum value of transmission power of the RF signal based on NR is required, the electronic device 101 may determine backoff max power configured for NR as a maximum transmission power.

Figure 6B:
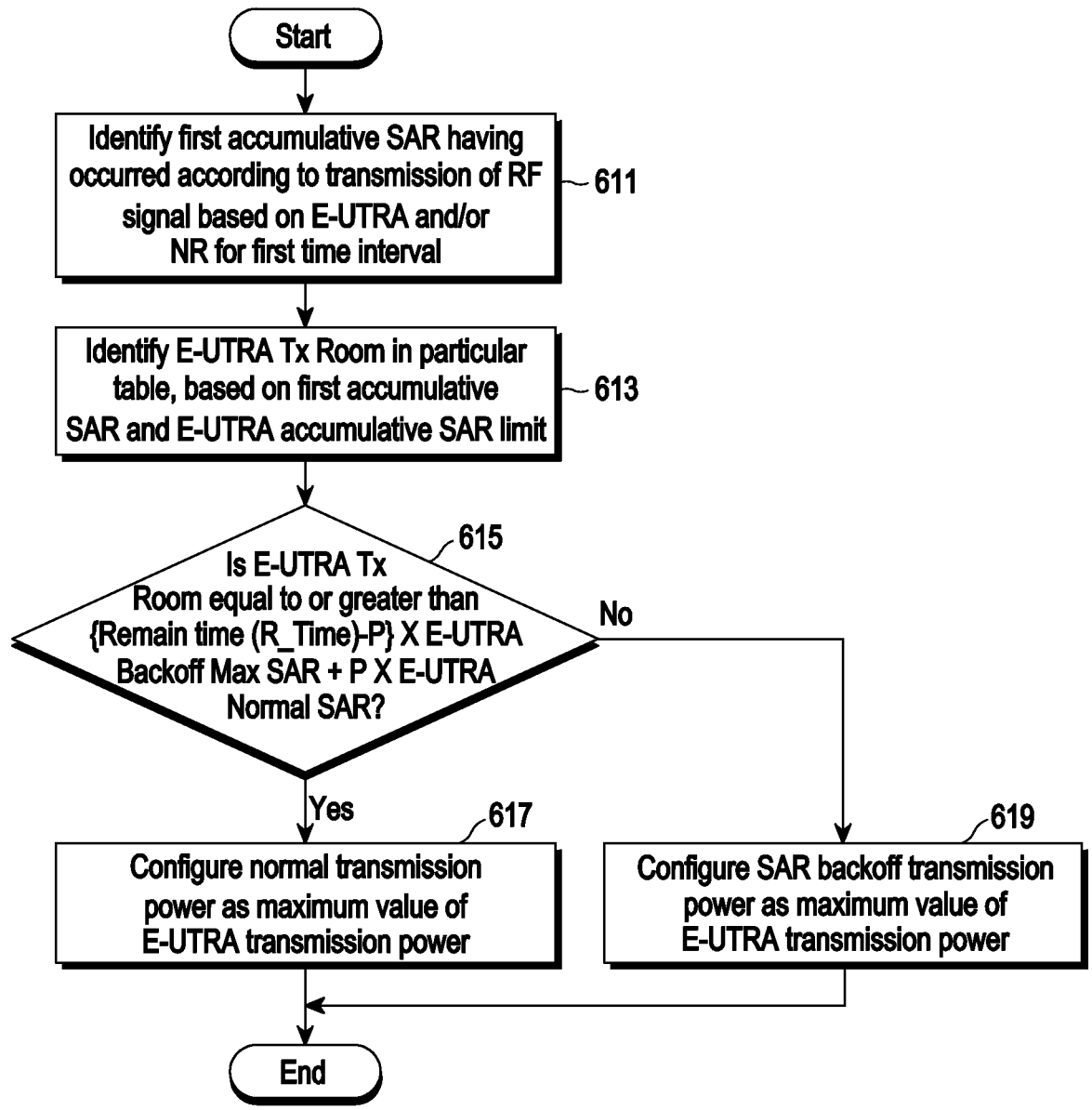
FIG. 6B is a flowchart illustrating an operation method of an electronic device according to various embodiments.

FIG. 6B is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may, in operation 611, identify a first accumulative SAR having occurred according to transmission of an RF signal based on E-UTRA and/or NR for a first time interval. In operation 613, the electronic device 101 may identify E-UTRA Tx Room in a particular table, based on the first accumulative SAR and E-UTRA accumulative SAR limit. For example, E-UTRA Tx Room may be obtained by subtracting the first accumulative SAR from an E-UTRA max accumulative SAR limit. In operation 615, the electronic device 101 may determine whether E-UTRA Tx Room is equal to or greater than {Remain time (R_Time)−P}×E-UTRA Backoff Max SAR+P×E-UTRA Normal SAR. {Remain time (R_Time)−P} may indicate, for example, future points in a particular table. E-UTRA Backoff Max SAR may be an SAR occurring in a case where an RF signal is transmitted with E-UTRA backoff max power. P may indicate, for example, a current time point described above with reference to FIG. 4A to FIG. 4E. E-UTRA Normal max SAR may be an SAR occurring in a case where an RF signal is transmitted with E-UTRA normal max power. If E-UTRA Tx Room is equal to or greater than {Remain time (R_Time)−P}×E-UTRA Backoff Max SAR+P×E-UTRA Normal SAR (operation 615—YES), the electronic device 101 may, in operation 617, configure a normal transmission power (E-UTRA normal max power) as a maximum value of transmission power of E-UTRA. In various embodiments, whether a value is equal to or greater than a particular value may be replaced with whether the value is greater than the particular value, and whether a value is equal to or less than a particular value may be replaced with whether the value is less than the particular value. E-UTRA Tx Room being equal to or greater than {Remain time (R_Time)−P}×E-UTRA Backoff Max SAR+P×E-UTRA Normal SAR may imply that Tx Room of E-UTRA is greater than the sum of SARs predicted at the current time point and a future time point, and thus the electronic device 101 may configure a normal transmission power (E-UTRA normal max power) as a maximum value of transmission power of E-UTRA. If E-UTRA Tx Room is less than {Remain time (R_Time)−P}×E-UTRA Backoff Max SAR+P×E-UTRA Normal SAR (operation 615—NO), the electronic device 101 may, in operation 619, configure an SAR backoff transmission power (E-UTRA backoff max power) as a maximum value of transmission power of E-UTRA. E-UTRA Tx Room being less than {Remain time (R_Time)−P}×E-UTRA Backoff Max SAR+P×E-UTRA Normal SAR may imply that Tx Room of E-UTRA is less than the sum of SARs predicted at the current time point and a future time point, and thus the electronic device 101 may configure an SAR backoff transmission power (E-UTRA backoff max power) as a maximum value of transmission power of E-UTRA.

Figure 6C:
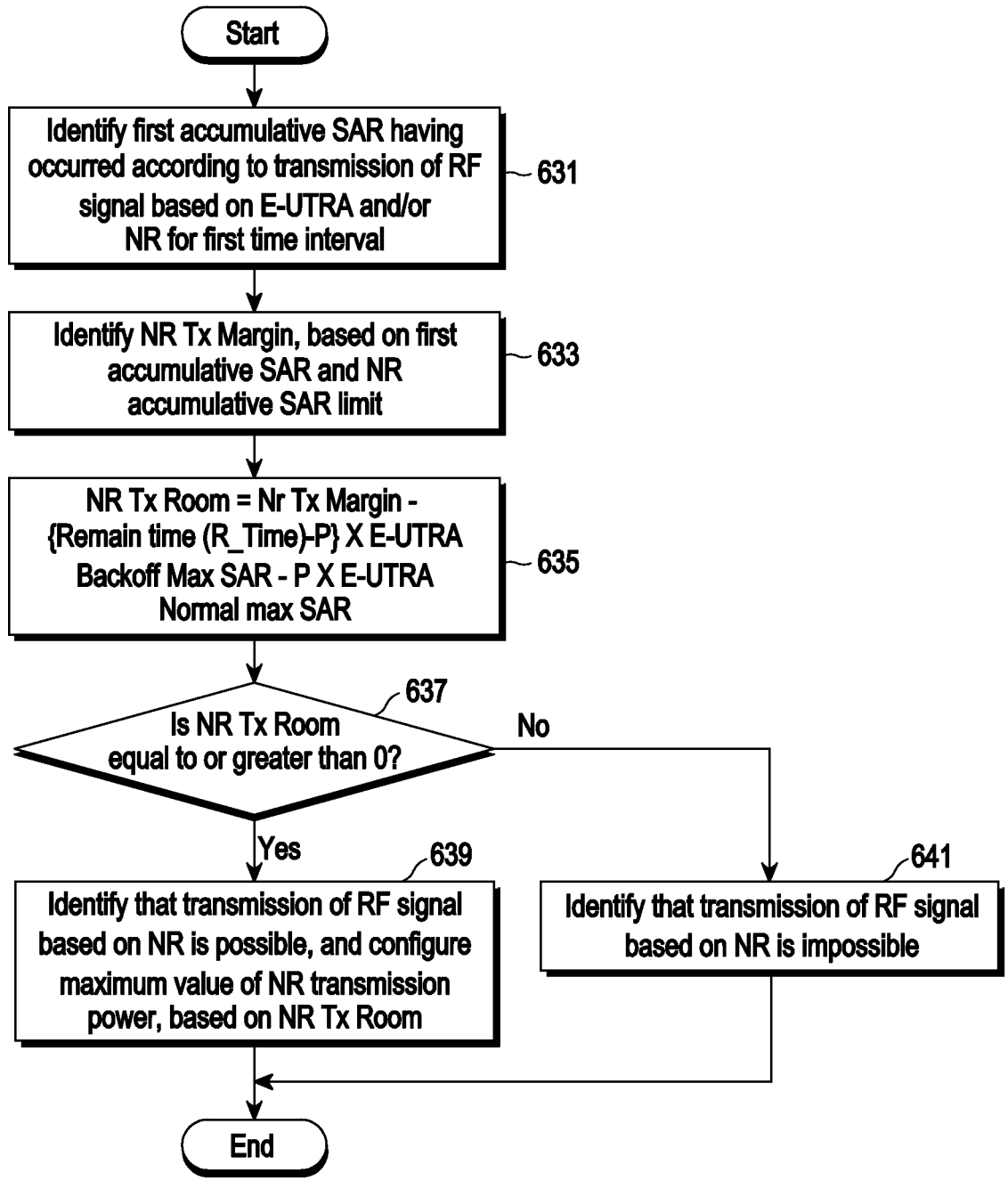
FIG. 6C is a flowchart illustrating an operation method of an electronic device according to various embodiments.

FIG. 6C is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may, in operation 631, identify a first accumulative SAR having occurred according to transmission of an RF signal based on E-UTRA and/or NR for a first time interval. The electronic device 101 may, in operation 633, identify NR Tx Margin, based on the first accumulative SAR and NR accumulative SAR limit. NR Tx Margin may be obtained by, for example, subtracting the first accumulative SAR from NR accumulative SAR limit. The electronic device 101 may, in operation 635, determine a value of NR Tx Room to be NR Tx Margin−{Remain time (R_Time)−P}×E-UTRA Backoff Max SAR−P×E-UTRA Normal max SAR. For example, {Remain time (R_Time)−P}×E-UTRA Backoff Max SAR may be the sum of SARs of a case of transmitting an RF signal based on only E-UTRA with a backed-off transmission power (E-UTRA backoff max power) at future time points. For example, P×E-UTRA Normal max SAR may be an SAR of a case of transmitting an RF signal based on only E-UTRA with a normal transmission power (E-UTRA normal max power) at the current time point. The electronic device 101 may, in operation 637, determine whether NR Tx Room is equal to or greater than 0. If NR Tx Room is equal to or greater than 0 (operation 637—YES), the electronic device 101 may, in operation 639, identify that transmission of an RF signal based on NR is possible, and configure a maximum value of NR transmission power, based on NR Tx Room. If NR Tx Room is less than 0 (operation 637—NO), the electronic device 101 may, in operation 641, identify that transmission of an RF signal based on NR is impossible. According to various embodiments, when it is identified that transmission of an RF signal based on NR is impossible, the electronic device 101 may determine that performing an RA procedure for NR is impossible. Even though a message causing an RA procedure for NR is received, the electronic device 101 may refrain from transmit an RA preamble.

In an embodiment, whether to back off a maximum value of transmission power of NR may be also determined in a method similar to the method of determining whether to back off a maximum value of transmission power of E-UTRA, as described above. For example, if NR Tx Margin−{Remain time (R_Time)−P}×E-UTRA Backoff Max SAR−P×E-UTRA Normal max SAR−P×NR Normal max SAR is equal to or greater than 0, the electronic device 101 may configure a transmission power to be NR normal max power. If NR Tx Margin−{Remain time (R_Time)−P}×E-UTRA Backoff Max SAR−P×E-UTRA Normal max SAR−P×NR Normal max SAR is less than 0, and NR Tx Margin−{Remain time (R_Time)−P}×E-UTRA Backoff Max SAR−P×E-UTRA Normal max SAR is equal to or greater than 0, the electronic device 101 may configure a transmission power to be NR backoff max power.

Figure 6D:
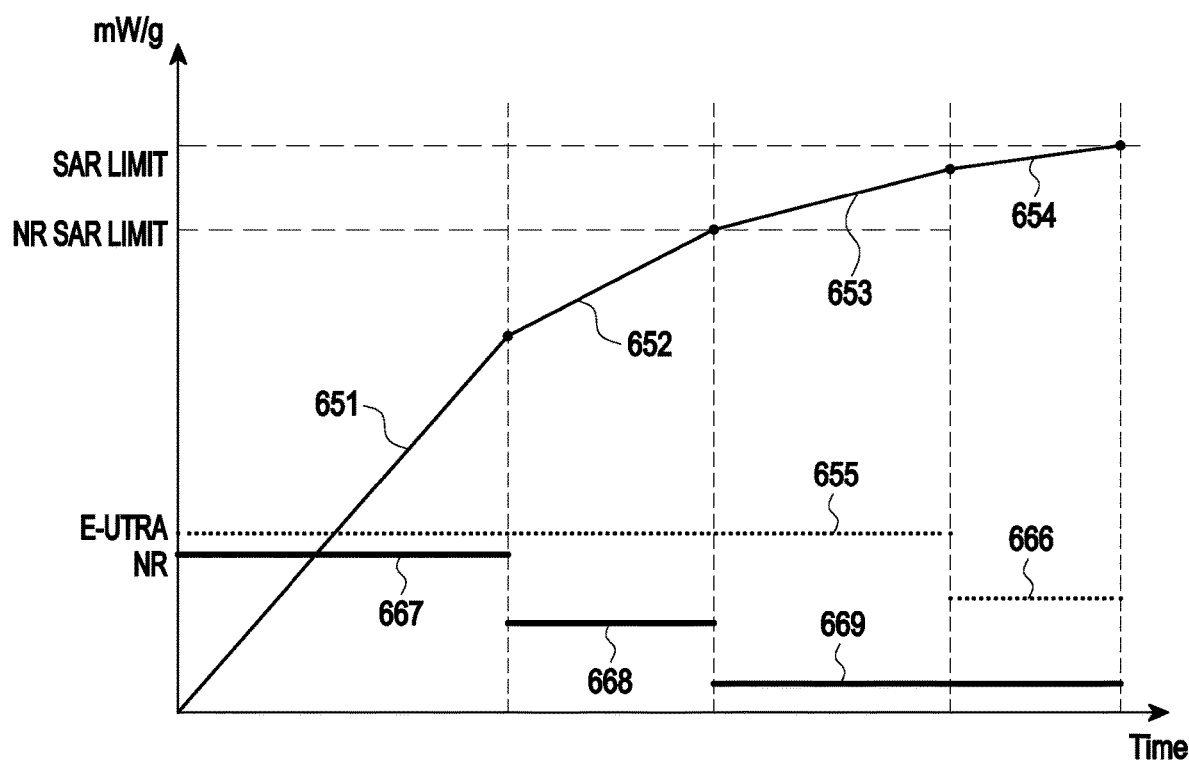
FIG. 6D is a diagram illustrating transmission power and an SAR according to various embodiments.

FIG. 6D is a diagram illustrating transmission power and an SAR according to various embodiments.

According to various embodiments, the electronic device 101 may transmit RF signals based on E-UTRA and NR according to DC at an initial time point, respectively. The electronic device 101 may configure a first transmission power 655 for E-UTRA, and configure a second transmission power 667 for NR. Each of transmission powers in FIG. 6D may indicate a maximum value of transmission power. According to transmission of RF signals, an accumulative SAR 651 may increase according to a first inclination. The electronic device 101 may determine that a backoff of a maximum value of transmission power for NR is required. Accordingly, the electronic device 101 may configure the first transmission power 655 for E-UTRA, and configure a third transmission power 668 for NR. According to transmission of RF signals, an accumulative SAR 652 may increase according to a second inclination. The electronic device 101 may determine that transmission of an RF signal based on NR is impossible, as described above with reference to FIG. 6C, for example. The electronic device 101 may configure the first transmission power 655 for E-UTRA, and configure a fourth transmission power 669 for NR, for example, 0. According to transmission of an RF signal based on E-UTRA, an accumulative SAR 653 may increase according to a third inclination. The electronic device 101 may determine that a backoff of transmission power for E-UTRA is required, as described above with reference to FIG. 6B, for example. Accordingly, the electronic device 101 may configure a fifth transmission power 666 for E-UTRA. According to transmission of an RF signal based on E-UTRA, an accumulative SAR 654 may increase according to a fourth inclination.

Figure 6E:
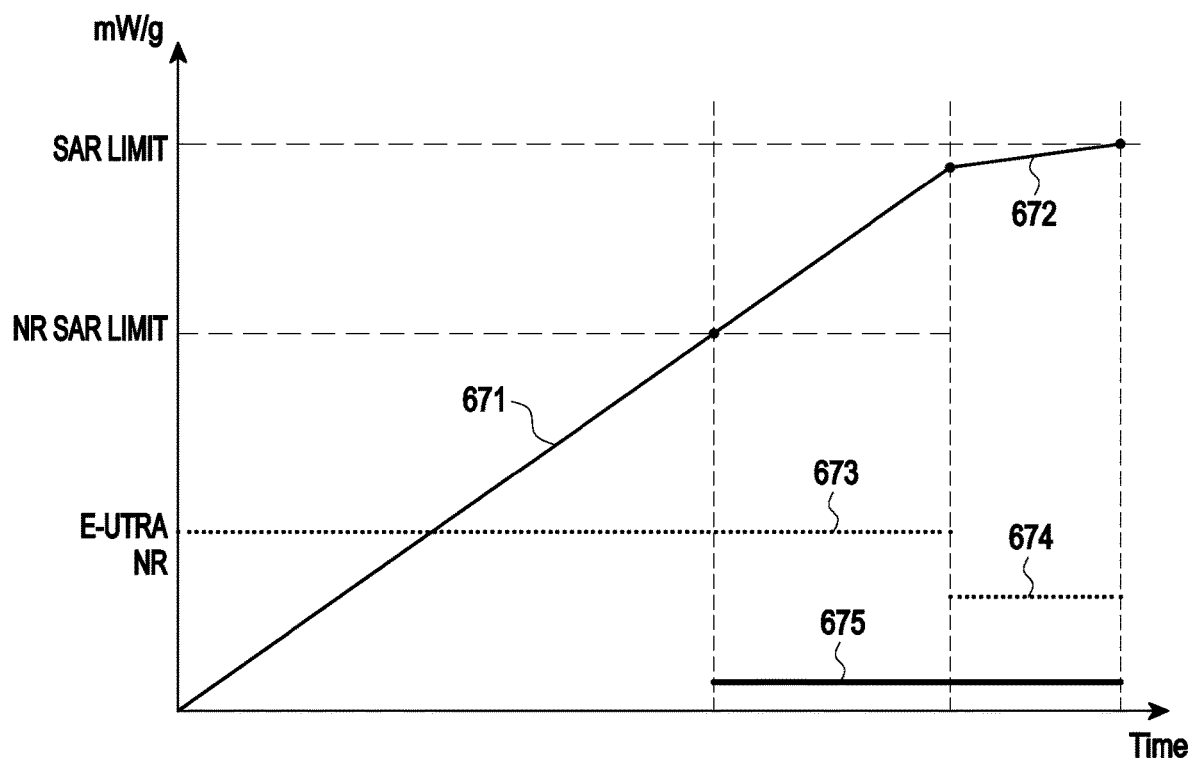
FIG. 6E is a diagram illustrating transmission power and an SAR according to various embodiments.

FIG. 6E is a diagram illustrating transmission power and an SAR according to various embodiments.

According to various embodiments, the electronic device 101 may receive an RRC reconfiguration message of SCG addition in NR at a time point of being connected to E-UTRA at an initial time point. The electronic device 101 may transmit an RF signal based on E-UTRA at the initial time point. The electronic device 101 may configure a first transmission power 673 for E-UTRA. According to transmission of an RF signal, an accumulative SAR 671 may increase according to a first inclination. The electronic device 101 may determine that transmission of an RF signal based on NR is impossible, as described above with reference to FIG. 6C. Accordingly, the electronic device 101 may configure transmission power of NR to be a second value 675 (e.g., 0). The electronic device 101 may not attempt an RA procedure. The electronic device 101 may determine that a backoff of a maximum value of transmission power of E-UTRA is required, as described above with reference to FIG. 6B. Accordingly, the electronic device 101 may configure a third transmission power 674 for E-UTRA. According to transmission of an RF signal based on E-UTRA, an accumulative SAR 672 may increase according to a second inclination.

As described above, the electronic device 101 may be configured to back off a maximum value of transmission power of a second RAT earlier than a maximum value of transmission power of a first RAT. In a case where transmission of an RF signal based on the second RAT is impossible, the electronic device 101 may not attempt an RA procedure. The electronic device 101 may not attempt an RA procedure, based on transmission power even when transmission of an RF signal based on the second RAT is possible, and this will be described hereinafter. A method for determining whether to attempt an RA procedure will be described in greater detail below with reference to FIG. 7A to FIG. 7D. Embodiments of FIG. 7A to FIG. 7D are described to operate according to EN-DC. However, this merely corresponds to an example, and a person skilled in the art may understand that, in the embodiments according to FIG. 7A to FIG. 7D and other embodiments described based on EN-DC, various RATs and various DCs may be used in replacement with E-UTRA and NR of EN-DC.

Figure 7A:
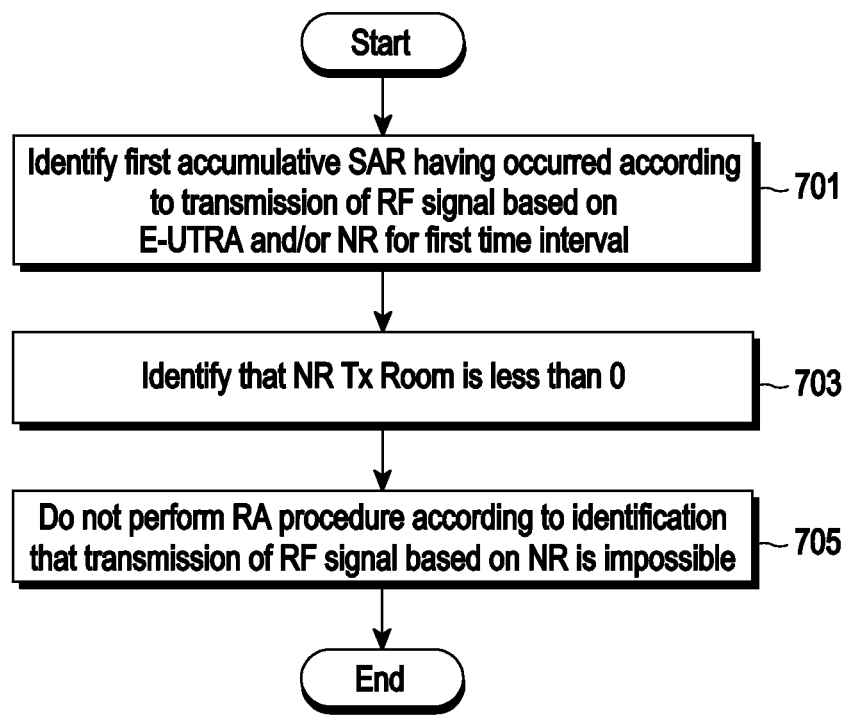
FIG. 7A is a flowchart illustrating an operation method of an electronic device according to various embodiments.

FIG. 7A is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may, in operation 701, identify a first accumulative SAR having occurred according to transmission of an RF signal based on E-UTRA and/or NR for a first time interval. In operation 703, the electronic device 101 may identify that NR Tx Room is less than 0. For example, the electronic device 101 may determine, as NR Tx Room, NR Tx Margin−{Remain time (R_Time)−P}×E-UTRA Backoff Max SAR−P×E-UTRA Normal max SAR, and may identify that this value is less than 0. In operation 705, the electronic device 101 may not perform an RA according to identification, based on that NR Tx Room is less than 0, that transmission of an RF signal based on NR is impossible. The electronic device 101 may calculate NR Tx Room with respect to at least a part of multiple tables, and if it is identified that NR Tx Room is less than 0 with respect to one table, the electronic device may identify that transmission of an RF signal based on NR is impossible. In a case where NR Tx Room is less than 0, transmission of an RF signal based on NR may be impossible, and thus the electronic device 101 may not attempt an RA procedure.

Figure 7B:
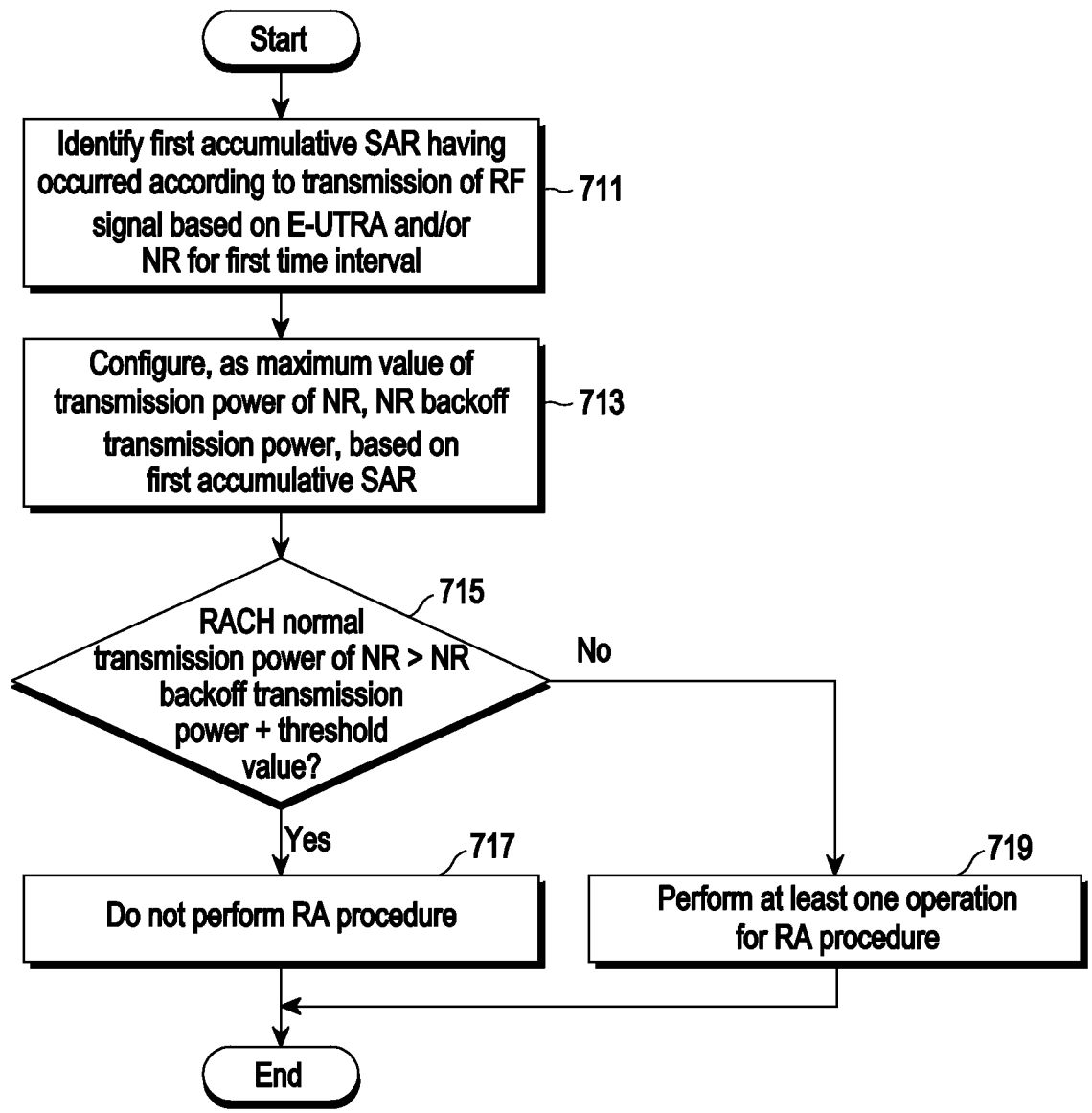
FIG. 7B is a flowchart illustrating an operation method of an electronic device according to various embodiments.

FIG. 7B is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may, in operation 711, identify a first accumulative SAR having occurred according to transmission of an RF signal based on E-UTRA and/or NR for a first time interval. In operation 713, the electronic device 101 may configure, as a maximum value of transmission power of NR, an NR backoff transmission power (NR backoff max power), based on the first accumulative SAR. For example, if NR Tx Margin−{Remain time (R_Time)−P}×E-UTRA Backoff Max SAR−P×E-UTRA Normal max SAR−P×NR Normal max SAR is less than 0, and NR Tx Margin−{Remain time (R_Time)−P}×E-UTRA Backoff Max SAR−P×E-UTRA Normal max SAR is equal to or greater than 0, the electronic device 101 may configure a transmission power to be NR backoff max power. For example, the electronic device 101 may determine whether to back off a maximum value of transmission power of an RF signal based on NR with respect to at least a part of tables, and if it is determined that a backoff is required for one table, the electronic device may be configured to back off a maximum value of transmission power. In a case where it is determined that a backoff is not required for all the tables, the electronic device 101 may configure normal transmission power as a maximum value of transmission power of an RF signal based on NR.

According to various embodiments, the electronic device 101 may, in operation 715, determine whether an RACH normal transmission power of NR is greater than the sum of the NR backoff transmission power and a threshold value. If the RACH normal transmission power of NR is greater than the sum of the NR backoff transmission power and the threshold value (operation 715—YES), the electronic device 101 may not perform an RA procedure in operation 717. If the RACH normal transmission power of NR is equal to or less than the sum of the NR backoff transmission power and the threshold value (operation 715—NO), the electronic device 101 may perform at least one operation for the RA procedure in operation 719. For example, the electronic device 101 may determine the RACH normal transmission power of NR, based on system information (e.g., SIB2) and a path loss. For example, the electronic device 101 may identify the sum of preambleInitialReceivedTargetPower and DELTA_PREAMBLE, identified based on the system information. For example, the electronic device 101 may identify, as the path loss (PL), the difference between an RSRP measured in the electronic device and referenceSignalPower identified from the system information. The electronic device 101 may configure an RACH target power according to the sum of the path loss (PL) and the sum of preambleInitialReceivedTargetPower and DELTA_PREAMBLE. The electronic device 101 may identify, as a normal transmission power, the smaller value among the RACH target power and PCMAX configured according to a power class of the electronic device 101. For example, a case where it is identified that an RSRP measured by the electronic device 101 is −80 dBm, preambleInitialReceivedTargetPower is −104 dBm, DELTA_PREAMBLE is 0 dBm, and referenceSignalPower is −80 dBm is employed. The electronic device 101 may identify−104 dBm as the sum of preambleInitialReceivedTargetPower and DELTA_PREAMBLE. The electronic device 101 may identify, as the pass loss (PL), 98 dBm which is 18 dBm-(−80 dBm). The electronic device 101 may identify, as the target power, −6 dBm which is the sum of −104 dBm and 98 dBm, and if PCMAX is, for example, 23 dBm, determine−6 dBm as a RACH normal transmission power.

In a case where a backed-off transmission power is smaller by a value exceeding a threshold value than the RACH normal transmission power of NR, the possibility that the RA procedure fails may be relatively high. The threshold value may be configured in consideration of the possibility that the RA procedure fails, and there is no limit thereto. Accordingly, in a case where a backed-off transmission power is smaller by a value exceeding a threshold value than the RACH normal transmission power of NR, the electronic device 101 may be configured not to attempt the RA procedure.

In an embodiment, the electronic device 101 may be configured not to perform the RA procedure in a case where it is determined that a backoff of transmission power of NR is required.

Figure 7C:
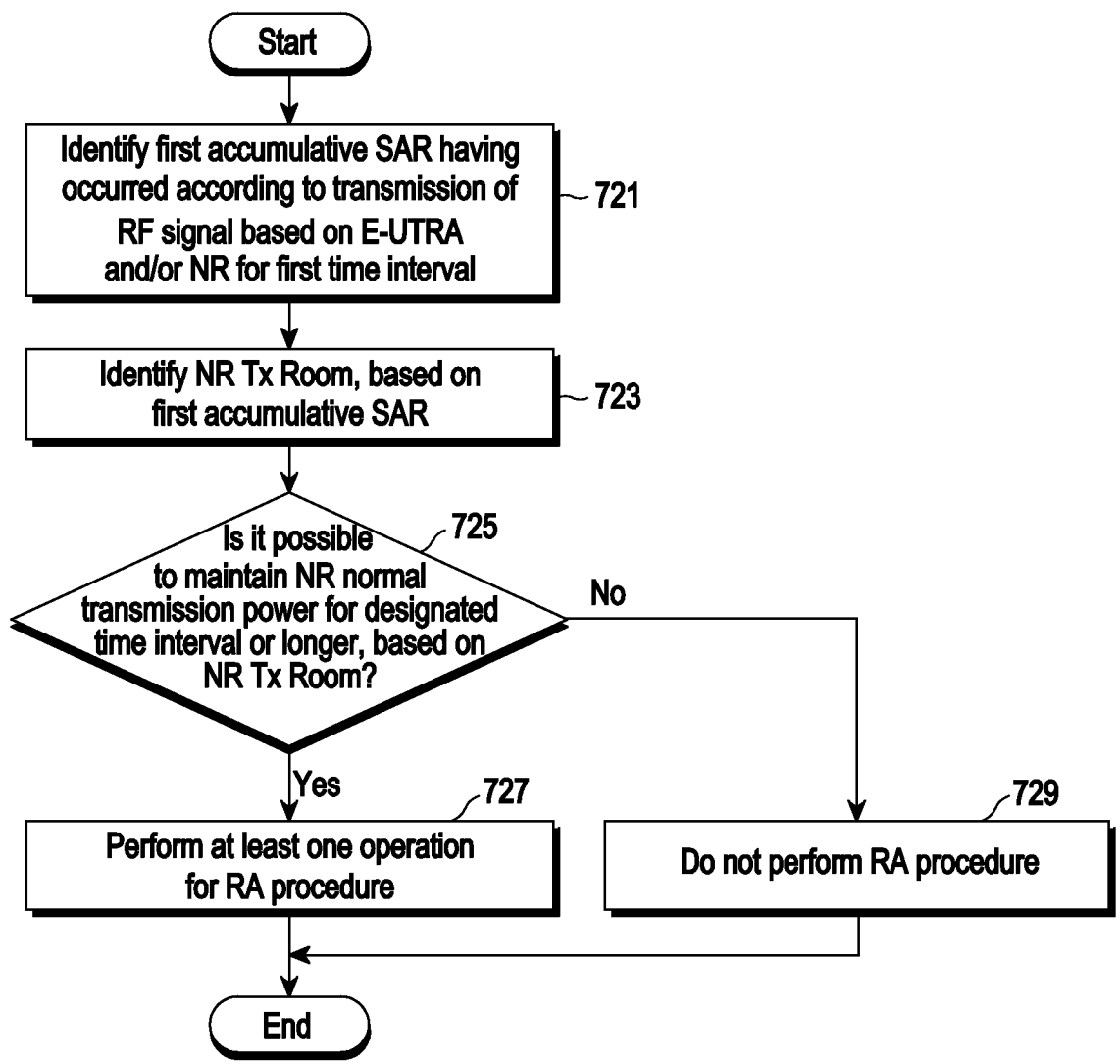
FIG. 7C is a flowchart illustrating an operation method of an electronic device according to various embodiments.

FIG. 7C is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may, in operation 721, identify a first accumulative SAR having occurred according to transmission of an RF signal based on E-UTRA and/or NR for a first time interval. In operation 723, the electronic device 101 may identify NR Tx Room, based on the first accumulative SAR. In operation 725, the electronic device 101 may determine, based on NR Tx Room, whether NR normal transmission power can be maintained for a designated time interval or longer. For example, the electronic device 101 may determine, based on the first accumulative SAR, that a backoff of a maximum value of transmission power of an RF signal based on NR is not required at the current time point. For example, based on that NR Tx Room−P×NR Normal max SAR, which is NR Tx Margin−{Remain time (R_Time)−P}×E-UTRA Backoff Max SAR−P×E-UTRA Normal max SAR−P×NR Normal max SAR, is equal to or greater than 0, the electronic device 101 may determine that a backoff of a maximum value of transmission power of an RF signal based on NR is not required at the current time point. The electronic device 101 may identify a time interval in which normal transmission power can be maintained, based on NR Tx Room and NR normal max SAR. For example, in a case where NR Tx Room is 3 mW/g, and NR normal max SAR is 2 mW/g in a particular table, the electronic device 101 may identify, as the time interval in which normal transmission power can be maintained, 1.5 seconds obtained by dividing 3 mW/g by 2 mW/g. The electronic device 101 may determine whether the time interval in which normal transmission power can be maintained is equal to or greater than a designated time interval.

If the time interval in which normal transmission power can be maintained is equal to or greater than the designated time interval (operation 725—YES), the electronic device 101 may perform at least one operation for an RA procedure in operation 727. If the time interval in which normal transmission power can be maintained is less than the designated time interval (operation 725—NO), the electronic device 101 may not perform the RA procedure in operation 729. Even if an RF signal can be transmitted with normal transmission power, in a case where the power maintaining time interval is relatively short, there may be a high possibility that the RA procedure fails while proceeding the RA procedure, or RLF occurs after RA success. In this case, the electronic device 101 may be configured not to attempt an RA procedure. In an embodiment, the electronic device 101 may perform at least one operation for an RA procedure in a case where a time interval of maintaining a backed-off transmission power is equal to or longer than a designated time interval. The electronic device 101 may not attempt an RA procedure in a case where the time interval of maintaining the backed-off transmission power is less than the designated time interval. In yet an embodiment, the electronic device 101 may perform at least one operation for an RA procedure in a case where the sum of a time interval of maintaining a normal transmission power and a time interval of maintaining a backed-off transmission power is equal to or longer than a designated time interval. The electronic device 101 may not attempt an RA procedure in a case where the sum of the time interval of maintaining the normal transmission power and the time interval of maintaining the backed-off transmission power is less than the designated time interval. The electronic device 101 may be configured to attempt an RA procedure in a case where a time interval in which normal transmission power of NR can be maintained, for each of tables, is longer than a remaining time for each of the tables.

Figure 7D:
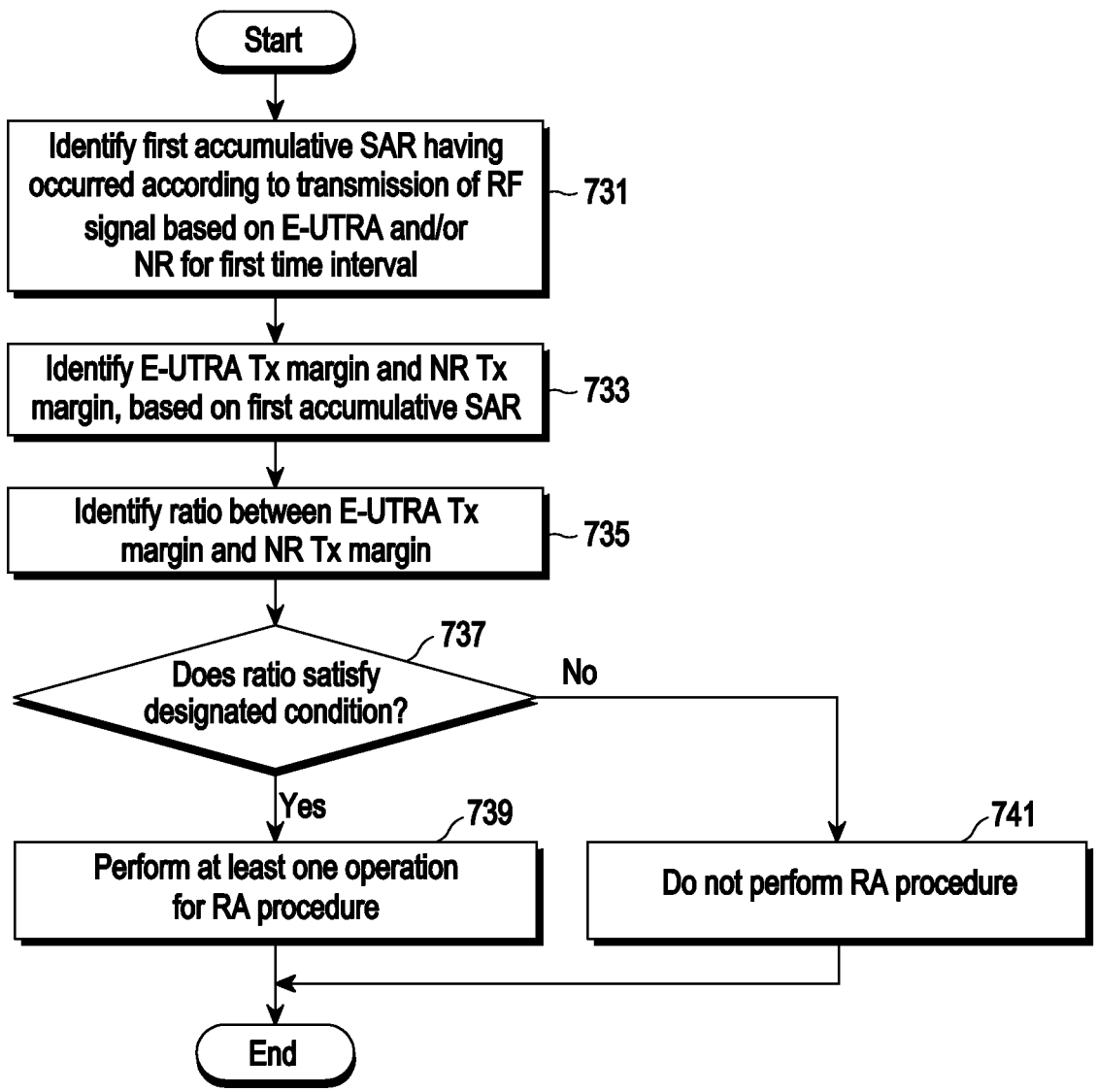
FIG. 7D is a flowchart illustrating an operation method of an electronic device according to various embodiments.

FIG. 7D is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may, in operation 731, identify a first accumulative SAR having occurred according to transmission of an RF signal based on E-UTRA and/or NR for a first time interval. The electronic device 101 may, in operation 733, identify E-UTRA Tx margin and NR Tx margin, based on the first accumulative SAR. In operation 735, the electronic device 101 may identify a ratio between E-UTRA Tx margin and NR Tx margin. The electronic device 101 may, in operation 737, determine whether the ratio satisfies a designated condition. If the ratio satisfies the designated condition (operation 737—YES), the electronic device 101 may perform at least one operation for an RA procedure in operation 739. If the ratio does not satisfy the designated condition (operation 737—NO), the electronic device 101 may not perform an RA procedure in operation 741. For example, the electronic device 101 may determine whether a value obtained by dividing NR Tx margin by E-UTRA Tx margin is equal to or greater than a designated threshold ratio. If the value obtained by dividing NR Tx margin by E-UTRA Tx margin is equal to or greater than the designated threshold ratio (e.g., 0.1), the electronic device 101 may attempt an RA procedure, and if the value obtained by dividing NR Tx margin by E-UTRA Tx margin is less than the designated threshold ratio, the electronic device may be configured not to attempt an RA procedure. In another example, if the value obtained by dividing NR Tx margin by EN-DC Tx margin is equal to or greater than a designated threshold ratio, the electronic device 101 may attempt an RA procedure, and if the value obtained by dividing NR Tx margin by EN-DC Tx margin is less than the designated threshold ratio, the electronic device may be configured not to attempt an RA procedure.

In an embodiment, the electronic device 101 may determine whether to attempt an RA procedure according to whether a value obtained by dividing NR Tx Room by E-UTRA Tx Room is equal to or greater than a designated threshold ratio. Alternatively, the electronic device 101 may determine whether to attempt an RA procedure according to whether a value obtained by dividing NR Tx Room by EN-DC Tx Room is equal to or greater than a designated threshold ratio.

Figure 8:
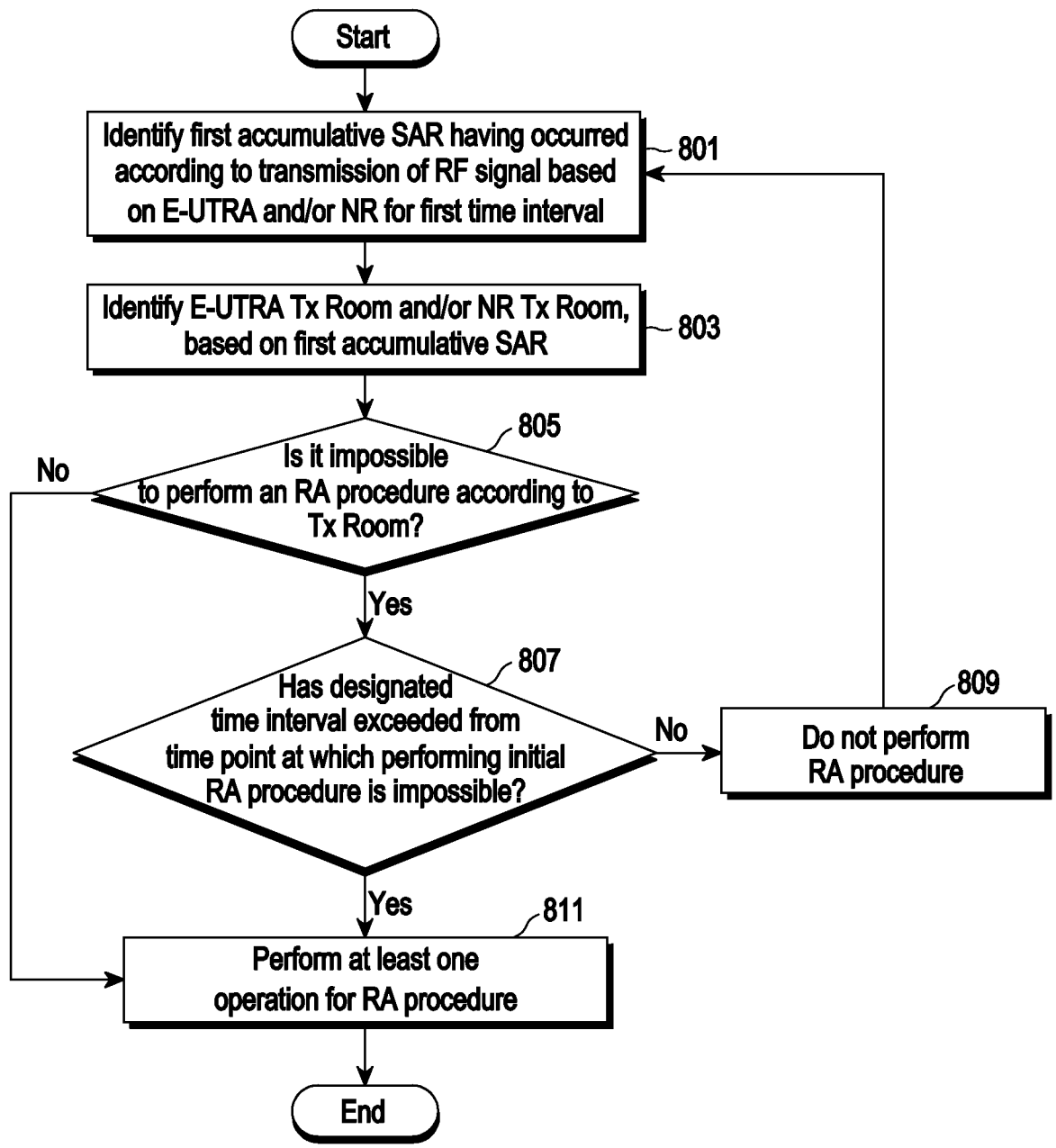
FIG. 8 is a flowchart illustrating an operation method of an electronic device according to various embodiments.

FIG. 8 is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may, in operation 801, identify a first accumulative SAR having occurred according to transmission of an RF signal based on E-UTRA and/or NR for a first time interval. The electronic device 101 may, in operation 803, identify E-UTRA Tx Room and/or NR Tx Room, based on the first accumulative SAR. The electronic device 101 may, in operation 805, determine whether performing an RA procedure is impossible according to identified Tx Room. In operation 803 and operation 805, the electronic device 101 may determine whether performing an RA procedure is impossible, based on E-UTRA Tx margin and/or NR Tx margin in replacement of E-UTRA Tx Room and/or NR Tx Room.

If it is determined that performing an RA procedure is impossible (operation 805—YES), the electronic device 101 may, in operation 807, determine whether a designated time interval has exceeded from a time point at which performing an initial RA procedure is determined to be impossible. If the designated time interval has not exceeded from the time point at which performing the initial RA procedure is determined to be impossible (operation 807—NO), the electronic device 101 may not perform the RA procedure in operation 809. If it is determined that performing an RA procedure is possible (operation 805—NO), or the designated time interval has exceeded from the time point at which performing the initial RA procedure is determined to be impossible (operation 807—YES), the electronic device 101 may perform at least one operation for an RA procedure in operation 811. In another example, the electronic device 101 may attempt an RA procedure and may identify an RA failure. The electronic device 101 may be configured to attempt again an RA procedure when a designated time interval has exceeded from a time point at which the RA failure is identified.

Figure 9:
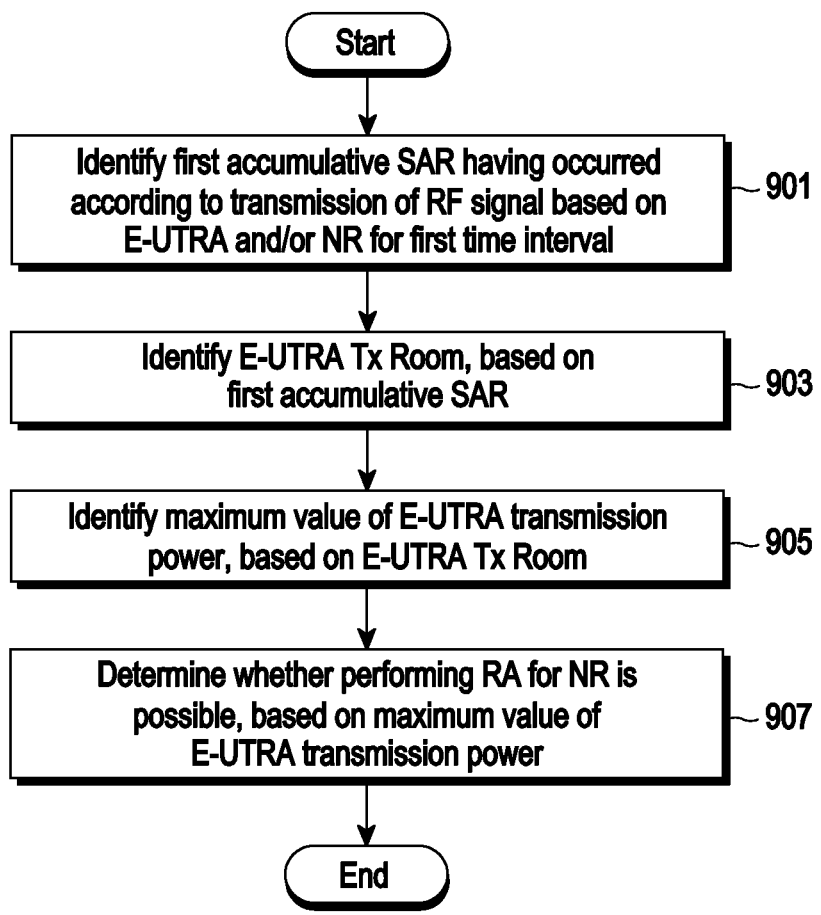
FIG. 9 is a flowchart illustrating an operation method of an electronic device according to various embodiments.

FIG. 9 is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may, in operation 901, identify a first accumulative SAR having occurred according to transmission of an RF signal based on E-UTRA and/or NR for a first time interval. The electronic device 101 may, in operation 903, identify E-UTRA Tx Room, based on the first accumulative SAR. The electronic device 101 may identify a maximum value of E-UTRA transmission power, based on E-UTRA Tx Room in operation 905. For example, as described above with reference to FIG. 6B, the electronic device 101 may configure, as the maximum value of E-UTRA transmission power, one of a normal transmission power or a backed-off transmission power. In operation 907, the electronic device 101 may determine whether performing an RA for NR is possible, based on the maximum value of E-UTRA transmission power. For example, in a case where the maximum value of E-UTRA transmission power is configured to be a normal transmission power, the electronic device 101 may determine that performing an RA for NR is possible. As another example, in a case where the maximum value of E-UTRA transmission power is configured to be equal or greater than a backed-off transmission power, the electronic device 101 may also determine that performing an RA for NR is possible. Alternatively, the electronic device 101 may determine whether performing an RA for NR is possible, based on Tx Room and/or Tx Margin for E-UTRA.

Figure 10A:
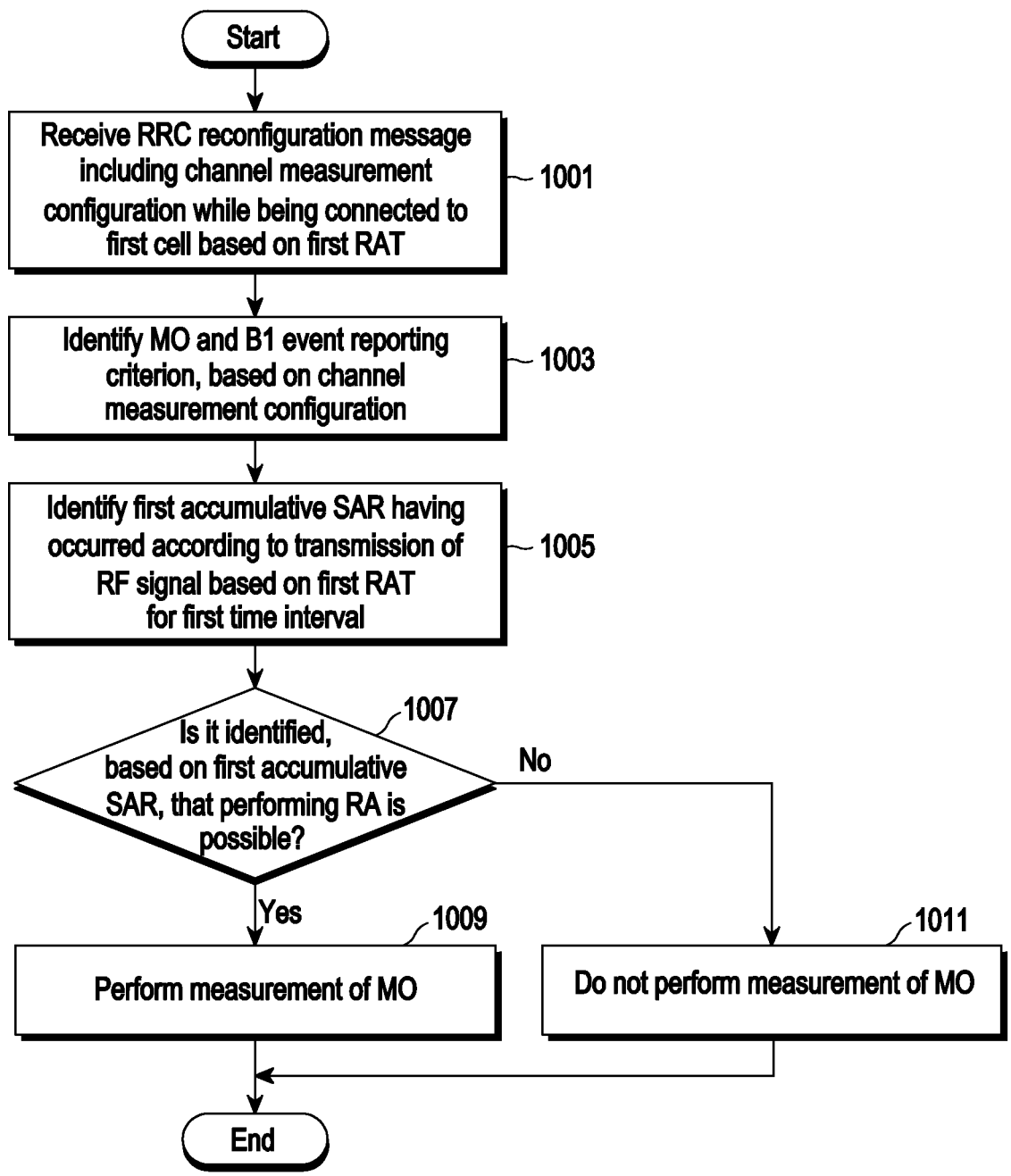
FIG. 10A is a flowchart illustrating an operation method of an electronic device according to various embodiments.

FIG. 10A is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may receive an RRC reconfiguration message including a channel measurement configuration (measurement configuration) (e.g., measConfig in 3GPP TS 38.331 or 36.331) while being connected to a first cell based on a first RAT in operation 1001. The electronic device 101 may perform a channel measurement configuration procedure (e.g., a measurement configuration procedure configured in 3GPP TS 38.331 or 36.331), based on the channel measurement configuration. For example, the electronic device 101 may be requested to perform a measurement at a frequency of an inter-RAT (e.g., NR, UTRA, GERAN, CDMA 2000 HRPD, or CDMA 2000 1×RTT). The channel measurement configuration may include information relating to a measurement object. The measurement object may include, for example, the subcarrier spacing and frequency/time position of a reference signal to be measured. The electronic device 101 may identify a frequency for a measurement based on the measurement object in the channel measurement configuration. The measurement object may include information (e.g., ARFCN-ValueEUTRA and/or ARFCN-ValueNR) indicating a frequency to be measured, a measurement object identity, or a cell blacklist and/or a cell whitelist. For example, a measurement object based on an inter-RAT may include ARFCN-Value associated with a second RAT. The channel measurement configuration of the RRC connection reconfiguration message may include a reporting configuration. For example, the reporting configuration may include at least one of a reporting criterion, a reporting format (reporting), or an RS type, but is not limited thereto. The reporting criterion is a condition to trigger a user device to transmit a measurement report, and may be a periodic or single event description. The channel measurement configuration of the RRC connection reconfiguration message may include at least one of a measurement identity, a quantity configuration, or a measurement gap. The measurement identify may be a list of measurement identities associated with the measurement object. The quantity configuration may define a measurement filtering configuration used in all event evaluations and related reports, and a periodic report on the measurement. The measurement gap is a period by which a user device performs measurement, and may be, for example, an interval in which uplink or downlink transmission is not scheduled. The electronic device 101 may measure, according to the channel measurement configuration, at least one of reference signal received power (RSRP), reference signal received quality (RSRQ), reference signal strength indicator (RSSI), or signal to interference-plus-noise ratio (SINR) corresponding to at least one of an inter-frequency, an intra-frequency, or an inter-RAT. The electronic device 101 performing RSRP measurement may imply that at least one of the processor 120, the first communication processor 212, the second communication processor 214, or the integrated communication processor 260 identifies an RSRP measurement value, but is not limited thereto. For example, the electronic device 101 may identify, as the RSRP measurement value, a linear average of power distribution (Watt [W] unit) of a resource element carrying at least one of a reference signal or a synchronization signal within a frequency bandwidth to be measured. There is no limit to the reference signal and the synchronization signal if the signal is defined in 3GPP. For example, the electronic device 101 may identify the RSRP measurement value, based on a linear average of power distribution at a reference point. The electronic device 101 may identify whether a measurement result satisfies a measurement condition. The electronic device 101 may, for example, identify a measurement result from a physical layer, and the electronic device 101 may determine, based on the measurement result, whether a reporting criterion associated with a corresponding measurement object is satisfied. The electronic device 101 may filter (e.g., layer 3 filtering) a performance result, and determine whether the reporting criterion is satisfied, based on the filtered result. "Measurement result" in various embodiments of the disclosure may indicate, for example, at least one of a value obtained from a physical layer or a value obtained by filtering a value obtained from a physical layer. A reporting criterion associated with an inter-RAT may be, for example, as follows, but is not limited thereto.

B1 event reporting criterion: Inter RAT neighbour becomes better than threshold

B2 event reporting criterion: PCell becomes worse than threshold) and inter RAT neighbour becomes better than threshold2

The above reporting criteria may follow, for example, 3GPP TS 36.331 or 3GPP TS 38.331, but there is no limit the type thereof.

As described above, the electronic device 101 may, in operation 1003, identify a measurement object (MO) and a B1 event reporting criterion, based on the measurement configuration. In operation 1005, the electronic device 101 may identify a first accumulative SAR having occurred according to transmission of an RF signal based on the first RAT for a first time interval. In operation 1007, the electronic device 101 may identify whether performing an RA procedure is possible, based on the first accumulative SAR. A method of identifying, by the electronic device 101, whether performing an RA procedure is possible may be based on at least a part of the methods described above with reference to FIG. 7A to FIG. 7D, FIG. 8, or FIG. 9. If performing an RA procedure is possible (operation 1007— YES), the electronic device 101 may perform a measurement of the measurement object in operation 1009. If performing an RA procedure is impossible (operation 1007—NO), the electronic device 101 may not perform a measurement of the measurement object in operation 1011. As the electronic device 101 does not perform a measurement of the measurement object, a measurement report may also not be performed, and eventually, an RA procedure may not be performed. In a case where performing an RA procedure is impossible, a measurement of the measurement object is not performed, whereby power and/or resources unnecessarily consumed for measurement can be reduced.

Figure 10B:
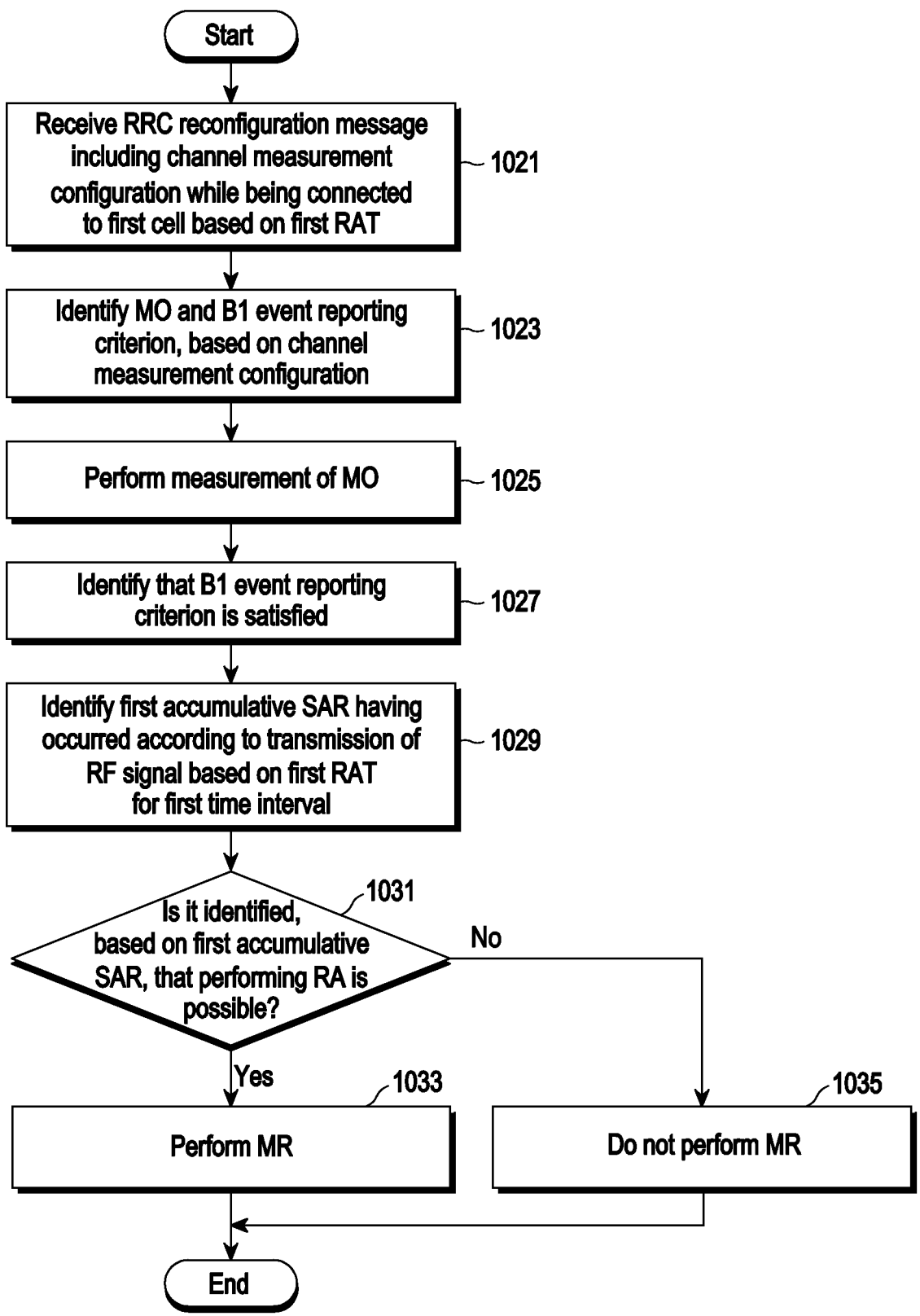
FIG. 10B is a flowchart illustrating an operation method of an electronic device according to various embodiments.

FIG. 10B is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may receive an RRC reconfiguration message including a channel measurement configuration while being connected to a first cell based on a first RAT in operation 1021. In operation 1023, the electronic device 101 may identify a measurement object (MO) and a B1 event reporting criterion, based on the channel measurement configuration. In operation 1025, the electronic device 101 may perform a measurement of the measurement object. In operation 1027, the electronic device 101 may identify that a measurement result satisfies the B1 event reporting criterion. In operation 1029, the electronic device 101 may identify a first accumulative SAR having occurred according to transmission of an RF signal based on the first RAT for a first time interval. In operation 1031, the electronic device 101 may identify whether performing an RA procedure is possible, based on the first accumulative SAR. A method of identifying, by the electronic device 101, whether performing an RA procedure is possible may be based on at least a part of the methods described above with reference to FIG. 7A to FIG. 7D, FIG. 8, or FIG. 9. If performing an RA procedure is possible (operation 1031—YES), the electronic device 101 may perform a report of the measurement result in operation 1033. If performing an RA procedure is impossible (operation 1031—No), the electronic device 101 may not perform the measurement report in operation 1035. The electronic device 101 may not perform a measurement report even when a measurement is performed and a reporting criterion is satisfied, and accordingly, an RA procedure may not be performed. In a case where performing an RA procedure is impossible, a measurement report is not performed, whereby unnecessarily consumed power and/or resources can be reduced.

Figure 11A:
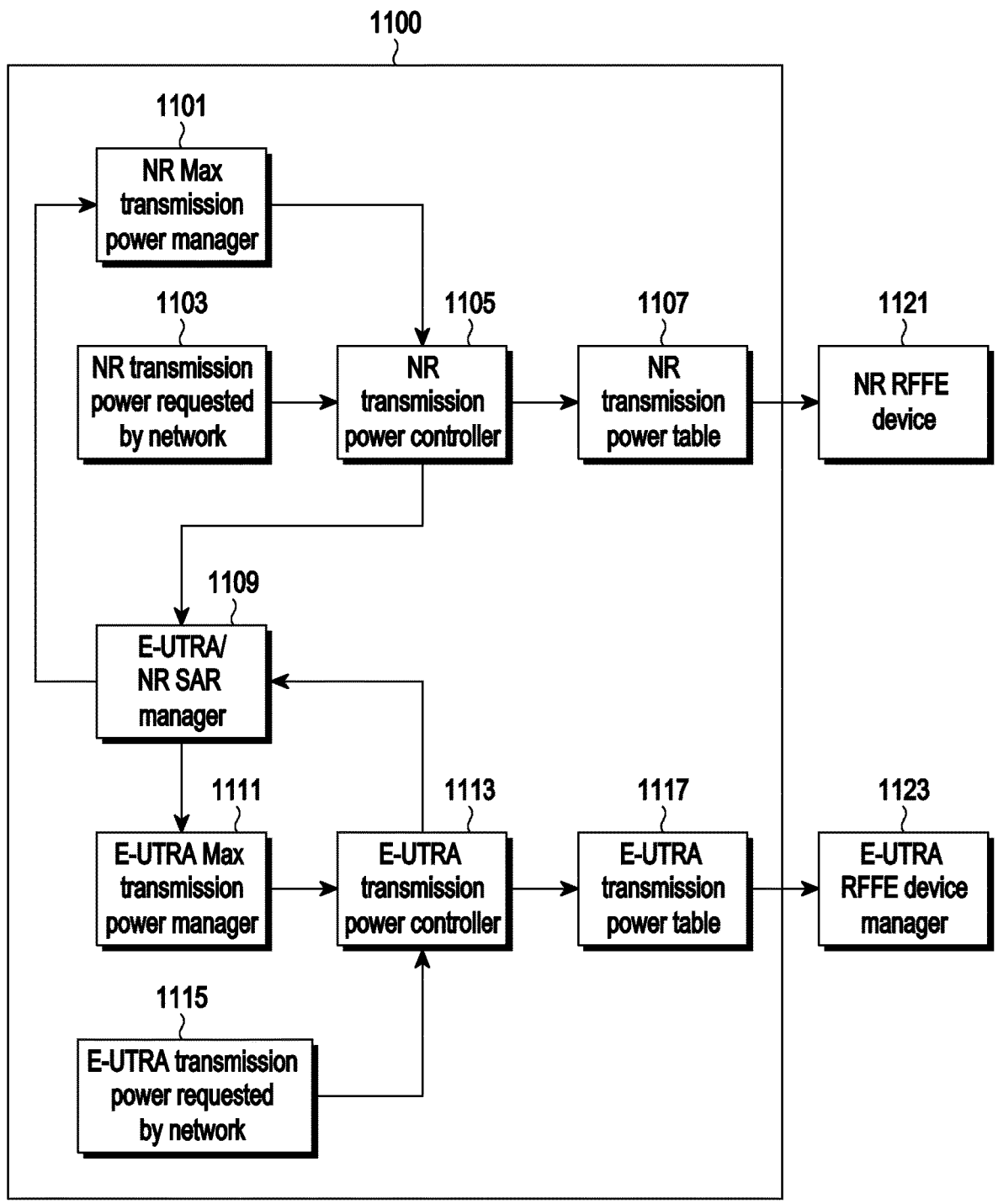
FIG. 11A is a diagram illustrating an operation method of an electronic device according to various embodiments.

FIG. 11A is a diagram illustrating an operation method of an electronic device according to various embodiments.

According to various embodiments, a baseband processing 1100 may be performed by, for example, a communication processor, but is not limited thereto. A NR MAX transmission power manager 1101 may receive, from an E-UTRA/NR SAR manager 1109, information of SAR-based NR maximum transmission power. The E-UTRA/NR SAR manager 1109 may transmit, to the NR Max transmission power manager 1101, the information of SAR-based NR maximum transmission power configured based on an accumulative SAR, according to various embodiments. The NR Max transmission power manager 1101 may determine minimum value of the received SAR-based NR maximum transmission power and PCMAX power as NR maximum transmission power. The NR Max transmission power manager 1101 may transmit the NR maximum transmission power to an NR transmission power controller 1105. The NR transmission power controller 1105 may compare the received NR maximum transmission power with a transmission power 1103 requested by a network, and provide the smaller value to an NR transmission power table 1107. In another example, the NR Max transmission power manager 1101 and the NR transmission power controller 1105 may be implemented into one element, and an implemented entity may provide, to the NR transmission power table 1107, the smaller value among received SAR-based NR maximum transmission power, PCMAX power, NR maximum transmission power, and an NR transmission power requested by a network. An RFFE parameter for each transmission power (e.g., PA bias and/or gain) may be configured in the NR transmission power table 1107. A parameter which is identified with reference to the NR transmission power table 1107 and corresponds to a value from the NR transmission power controller 1105 may be provided to an NR RFFE device 1121. The NR RFFE device 1121 may process an RF signal according to the provided parameter.

According to various embodiments, an E-UTRA Max transmission power manager 1111 may receive, from the E-UTRA/E-UTRA manager 1109, the information of SAR-based E-UTRA maximum transmission power. The E-UTRA/NR SAR manager 1109 may transmit, to the E-UTRA Max transmission power manager 1111, the information of SAR-based E-UTRA maximum transmission power configured based on an accumulative SAR, according to various embodiments. The E-UTRA Max transmission power manager 1111 may determine the smaller value among the received SAR-based E-UTRA maximum transmission power and PCMAX power, as E-UTRA maximum transmission power. The E-UTRA Max transmission power manager 1111 may transmit the E-UTRA maximum transmission power to an E-UTRA transmission power controller 1113. The E-UTRA transmission power controller 1113 may compare the received E-UTRA maximum transmission power with a transmission power 1115 requested by a network, and provide the smaller value to an E-UTRA transmission power table 1117. In another example, the E-UTRA Max transmission power manager 1109 and the NR transmission power controller 1113 may be implemented into one element, and an implemented entity may provide, to the E-UTRA transmission power table 1117, the smaller value among received SAR-based E-UTRA maximum transmission power, PCMAX power, E-UTRA maximum transmission power, and an E-UTRA transmission power requested by a network. An RFFE parameter for each transmission power (e.g., PA bias and/or gain) may be configured in the E-UTRA transmission power table 1117. A parameter which is identified with reference to the E-UTRA transmission power table 1117 and corresponds to a value from the E-UTRA transmission power controller 1113 may be provided to an E-UTRA RFFE device 1123. The E-UTRA RFFE device 1123 may process an RF signal according to the provided parameter.

Figure 11B:
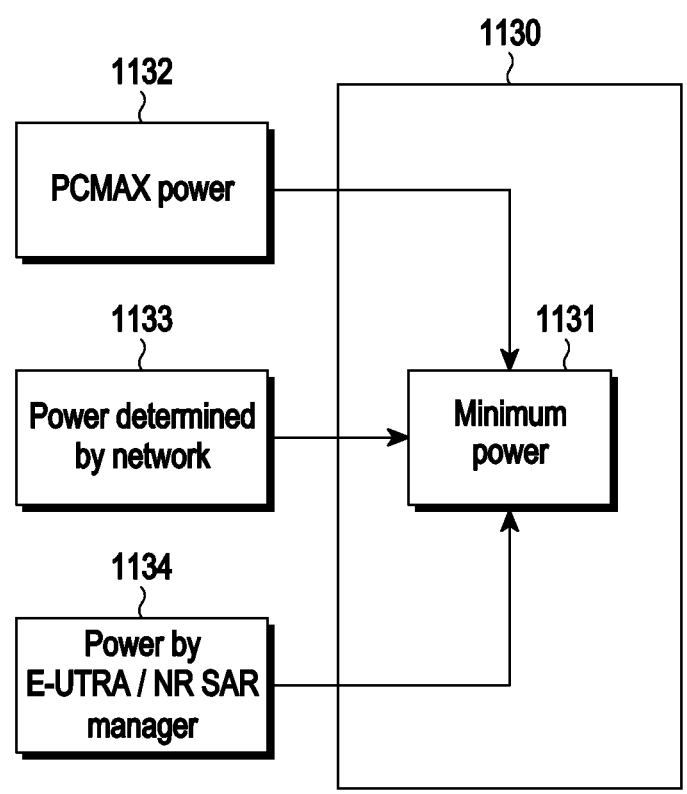
FIG. 11B is a diagram illustrating an operation method of an electronic device according to various embodiments.

FIG. 11B is a diagram illustrating an operation method of an electronic device according to various embodiments.

According to various embodiments, a maximum transmission power manager 1130 (e.g., the NR Max transmission power manager 1101 and/or the E-UTRA Max transmission power manager 1111 in FIG. 11A) may receive a PCMAX power 1132, a power 1133 determined by a network, and/or an SAR-based power 1134 configured by an E-UTRA/NR SAR manager. As described above, the maximum transmission power manager and a transmission power controller may be implemented into one, and the power 1133 determined by the network may also be considered. According to an implementation, the power 1133 determined by the network may not be considered. The maximum transmission power manager 1130 may select a smallest value 1131 among the received values, to determine a maximum transmission power corresponding to a particular RAT.

Figure 11C:
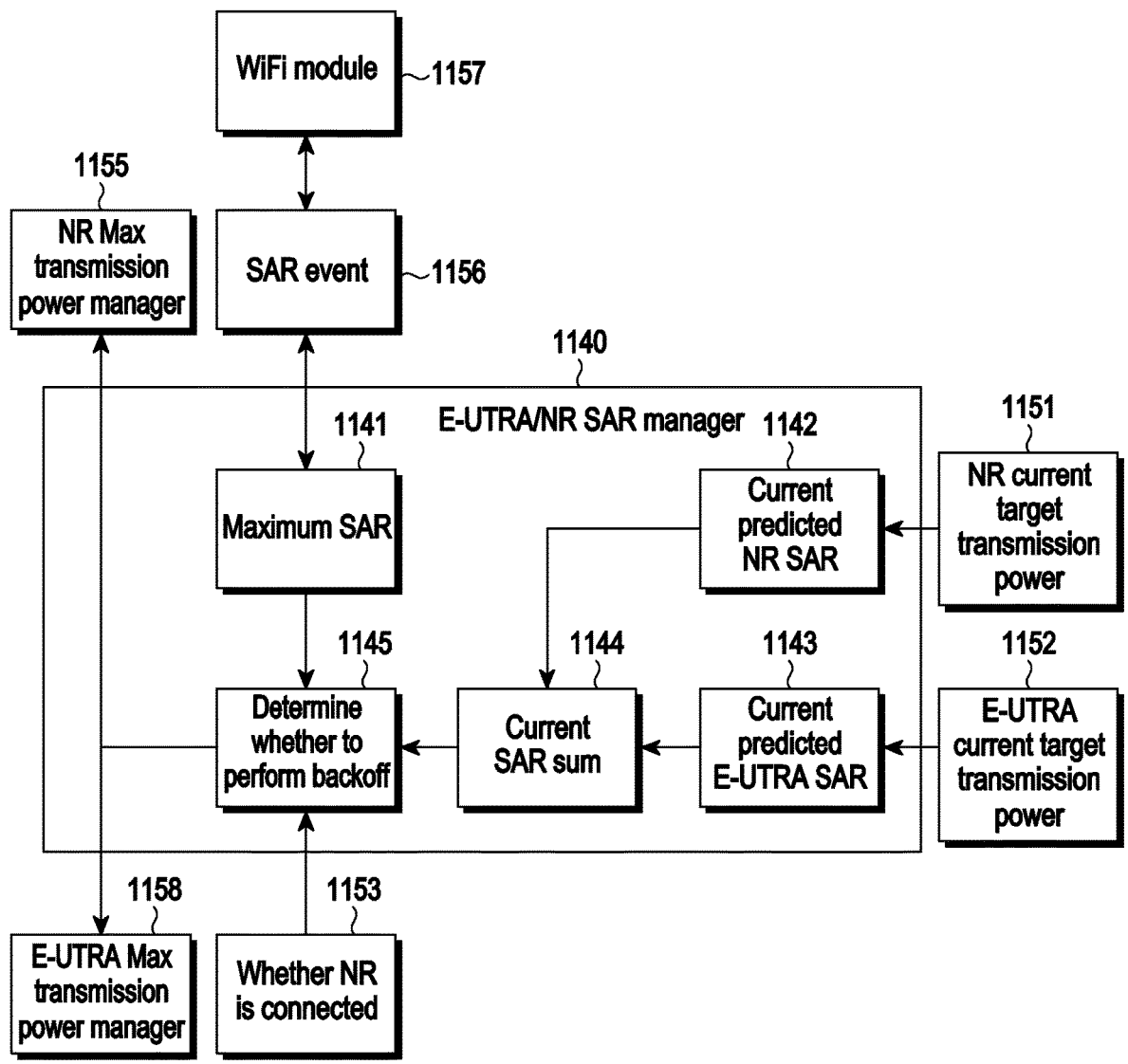
FIG. 11C is a diagram illustrating an operation method of an electronic device according to various embodiments.

FIG. 11C is a diagram illustrating an operation method of an electronic device according to various embodiments.

According to various embodiments, an E-UTRA/NR SAR manager 1140 may receive an NR current target transmission power 1151 and an E-UTRA current target transmission power 1152. The E-UTRA/NR SAR manager 1140 may identify a current predicted NR SAR 1142, based on the received NR current target transmission power 1151. The E-UTRA/NR SAR manager 1140 may identify a current predicted E-UTRA SAR 1143, based on the received E-UTRA current target transmission power 1152. The E-UTRA/NR SAR manager 1140 may identify a current SAR sum 1144 which is the sum of the current predicted NR SAR 1142 and the current predicted E-UTRA SAR 1143. The E-UTRA/NR SAR manager 1140 may determine whether to back off a transmission power (1145), using the current SAR sum 1144 and at least one of whether NR is connected (1153) or a maximum SAR 1141 (e.g., a Max accumulative SAR). The maximum SAR 1141 may be configured based on, for example, an SAR event 1156 which is determined at least based on information from a WiFi module 1157. For example, an SAR generated by WiFi may also be used to determine whether to perform backoff. The E-UTRA/NR SAR manager 1140 may determine whether to perform backoff, with respect to each of E-UTRA and NR. The E-UTRA/NR SAR manager 1140 may provide an NR maximum transmission power determined according to whether to perform backoff, to an NR max transmission power manager 1155. The E-UTRA/NR SAR manager 1140 may provide an E-UTRA maximum transmission power determined according to whether to perform backoff, to an E-UTRA max transmission power manager 1158.

Figure 12:
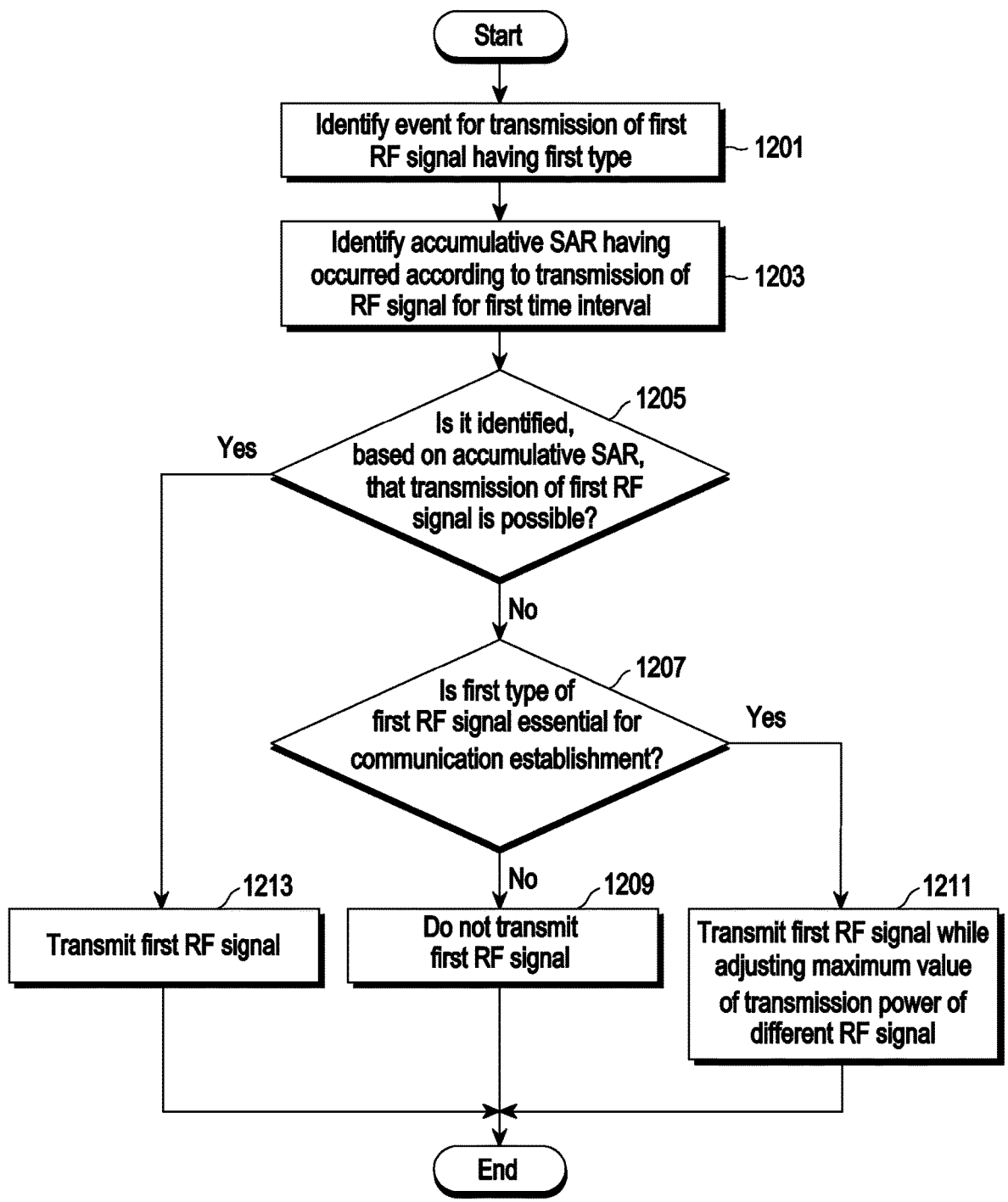
FIG. 12 is a flowchart illustrating an operation method of an electronic device according to various embodiments.

FIG. 12 is a flowchart illustrating an operation method of an electronic device according to various embodiments.

According to various embodiments, the electronic device 101 (e.g., at least one of the processor 120, the first communication processor 212, the second communication processor 214, or the integrated communication processor 260) may identify an event for transmission of a first RF signal having a first type in operation 1201. The electronic device 101 may, in operation 1203, identify an accumulative SAR having occurred according to transmission of an RF signal for a first time interval. The electronic device 101 may identify whether transmission of the first RF signal is possible, based on the accumulative SAR in operation 1205. Various embodiments for determining whether transmission of the first RF signal is possible, based on the accumulative SAR have been described above, and thus the description is omitted here. If it is identified that transmission of the first RF signal is possible (operation 1205—YES), the electronic device 101 may transmit the first RF signal in operation 1213. If it is identified that transmission of the first RF signal is impossible (operation 1205—NO), the electronic device 101 may determine whether the first type of the first RF signal is essential for communication establishment in operation 1207. For example, if the first type corresponds to an RA preamble for SCG addition, the electronic device 101 may determine that the first type is not essential for communication establishment. For example, if the first type corresponds to an RA preamble for SCG addition in CA, the electronic device 101 may determine that the first type is not essential for communication establishment. For example, the electronic device 101 may manage a priority for each type to determine whether the type is essential for communication establishment, and may determine whether a type is essential for communication establishment according to a corresponding priority. For example, if the first type corresponds to a signal associated with an anchor cell, the electronic device 101 may determine that the first type is essential for communication establishment. For example, whether the first type is essential for communication establishment may be determined according to whether the electronic device 101 is disconnected from all networks according to non-transmission of the first RF signal having the first type, but is not limited thereto. If the first type is not essential for communication establishment (operation 1207—NO), the electronic device 101 may refrain from transmit the first RF signal in operation 1209. If the first type is essential for communication establishment (operation 1207—YES), the electronic device 101 may, in operation 1211, transmit the first RF signal while adjusting a maximum value of transmission power of a different RF signal.

According to various embodiments, an electronic device (e.g., the electronic device 101) may include: at least one processor (e.g., at least one of the processor 120, the first communication processor 212, the second communication processor 214, or the integrated communication processor 260), wherein the at least one processor is configured to: receive at least one message causing a random access (RA) procedure for a second cell based on a second radio access technology (RAT) different from a first RAT while being connected to a first cell based on the first RAT, identify, based on the reception of the at least one message, a first accumulative specific absorption rate (SAR) having occurred according to transmission of at least one RF signal based on the first RAT and/or the second RAT for a first time interval, transmit an RA preamble message to the second cell based on determining, based on the first accumulative SAR, that performing the RA procedure for the second cell based on the second RAT is possible, and refrain from transmitting the RA preamble message based on determining, based on the first accumulative SAR, that performing the RA procedure for the second cell based on the second RAT is impossible.

According to various embodiments, the at least one processor may be configured to receive at least one radio resource control (RRC) reconfiguration message of a secondary cell group (SCG) addition configuration associated with the second cell, as at least a part of an operation of receiving at least one message causing an RA procedure for the second cell based on the second RAT, and identify the first accumulative SAR having occurred based on transmission of at least one RF signal based on the first RAT, as at least a part of an operation of identifying the first accumulative SAR having occurred according to transmission of at least one RF signal based on the first RAT and/or the second RAT for the first time interval.

According to various embodiments, the at least one processor may be configured to receive a special cell (SpCell) change command or a handover command for a change from a third cell based on the second RAT to the second cell while being connected to the first cell and the third cell, as at least a part of an operation of receiving at least one message causing an RA procedure for the second cell based on the second RAT, and identify the first accumulative SAR having occurred based on transmission of at least one first RF signal based on the first RAT and transmission of at least one second RF signal based on the second RAT, as at least a part of an operation of identifying the first accumulative SAR having occurred based on transmission of at least one RF signal based on the first RAT and/or the second RAT for the first time interval.

According to various embodiments, the at least one processor may be further configured to: determine, based on the first accumulative SAR, whether transmission of an RF signal based on the second RAT is possible, and the at least one processor may be configured to refrain from transmitting the RA preamble message, based on determining that transmission of an RF signal based on the second RAT is impossible, as at least a part of an operation of refraining from transmitting the RA preamble message based on determining that performing the RA procedure for the second cell based on the second RAT is impossible.

According to various embodiments, the at least one processor may be configured to: as at least a part of an operation of determining, based on the first accumulative SAR, whether transmission of an RF signal based on the second RAT is possible, identify a first value obtained by subtracting the first accumulative SAR from an accumulative SAR limit value for the second RAT corresponding to a designated measurement time interval, identify a second value obtained by multiplying a measurement unit time interval and an SAR occurring based on an RF signal based on the first RAT being transmitted with a normal transmission power, identify a third value obtained by multiplying a value obtained by subtracting the measurement unit time interval from a remaining time interval obtained by subtracting a counting time interval of the first accumulative SAR from the designated measurement time interval, and an SAR occurring based on an RF signal based on the first RAT being transmitted with a backed-off transmission power, and determine that transmission of an RF signal based on the second RAT is impossible, based on a result of subtracting a sum of the second value and the third value from the first value being less than 0.

According to various embodiments, the at least one processor may be further configured to: identify, based on the first accumulative SAR, a maximum value of transmission power of an RF signal based on the second RAT, and the at least one processor may be configured to refrain from transmitting the RA preamble message, based on a maximum value of transmission power of an RF signal based on the second RAT, as at least a part of an operation of refraining from transmitting the RA preamble message based on determining that performing the RA procedure for the second cell based on the second RAT is impossible.

According to various embodiments, the at least one processor may be configured to: as at least a part of an operation of refraining from transmitting the RA preamble message, based on a maximum value of transmission power of an RF signal based on the second RAT, identify a normal transmission power configured for a random access channel (RACH) based on the second RAT, and refrain from transmitting the RA preamble message based on the normal transmission power being greater than a threshold value and a maximum value of transmission power of an RF signal based on the second RAT.

According to various embodiments, the at least one processor may be configured to: as at least a part of an operation of refraining from transmitting the RA preamble message, based on a maximum value of transmission power of an RF signal based on the second RAT, refrain from transmitting the RA preamble message, based on a maximum value of transmission power of an RF signal based on the second RAT being determined to be a backed-off transmission power.

According to various embodiments, the at least one processor may be further configured to: identify, based on the first accumulative SAR, a maximum value of transmission power of an RF signal based on the second RAT, and identify a maintainable time interval for which a maximum value of transmission power of an RF signal based on the second RAT can be maintained, and the at least one processor may be configured to: refrain from transmitting the RA preamble message, based on the maintainable time interval being less than a designated time interval, as at least a part of an operation of refraining from transmitting the RA preamble message based on determining that performing the RA procedure for the second cell based on the second RAT is impossible.

According to various embodiments, the at least one processor may be further configured to: identify a first value obtained by subtracting the first accumulative SAR from an accumulative SAR limit value for the first RAT corresponding to a designated measurement time interval, and identify a second value obtained by subtracting the first accumulative SAR from an accumulative SAR limit value for the second RAT corresponding to the designated measurement time interval, and the at least one processor may be configured to: refrain from transmitting the RA preamble message, based on a ratio between the first value and the second value, as at least a part of an operation of refraining from transmitting the RA preamble message based on determining that performing the RA procedure for the second cell based on the second RAT being impossible.

According to various embodiments, the at least one processor may be further configured to, after the RA preamble message is not transmitted, transmit the RA preamble message, based on passage of a designated time interval from a time point of refraining from transmitting the RA preamble message.

According to various embodiments, the at least one processor may be further configured to: identify, based on the first accumulative SAR, a maximum value of transmission power of an RF signal based on the first RAT, and the at least one processor may be configured to: refrain from transmitting the RA preamble message, based on a maximum value of transmission power of an RF signal based on the first RAT, as at least a part of an operation of refraining from transmitting the RA preamble message based on determining that performing the RA procedure for the second cell based on the second RAT is impossible.

According to various embodiments, an operation method of an electronic device may include: receiving at least one message causing a random access (RA) procedure for a second cell based on a second radio access technology (RAT) different from a first RAT while being connected to a first cell based on the first RAT, identifying, based on the reception of the at least one message, a first accumulative specific absorption rate (SAR) having occurred based on transmission of at least one RF signal based on the first RAT and/or the second RAT for a first time interval, and transmitting an RA preamble message to the second cell based on determining, based on the first accumulative SAR, that performing the RA procedure for the second cell based on the second RAT is possible, wherein the RA preamble message is not transmitted based on determining, based on the first accumulative SAR, that performing the RA procedure for the second cell based on the second RAT is impossible.

According to various embodiments, the receiving of at least one message causing an RA procedure for the second cell based on the second RAT may include: receiving at least one radio resource control (RRC) reconfiguration message of an secondary cell group (SCG) addition configuration associated with the second cell, and the identifying of the first accumulative SAR having occurred based on transmission of at least one RF signal based on the first RAT and/or the second RAT for the first time interval may include identifying the first accumulative SAR having occurred based on transmission of at least one RF signal based on the first RAT.

According to various embodiments, the receiving of at least one message causing an RA procedure for the second cell based on the second RAT may include receiving an SpCell change command or a handover command for a change from a third cell based on the second RAT to the second cell while being connected to the first cell and the third cell, and the identifying of the first accumulative SAR having occurred based on transmission of at least one RF signal based on the first RAT and/or the second RAT for the first time interval may include: identifying the first accumulative SAR having occurred based on transmission of at least one first RF signal based on the first RAT and transmission of at least one second RF signal based on the second RAT.

According to various embodiments, the operation method of the electronic device may further include: determining, based on the first accumulative SAR, whether transmission of an RF signal based on the second RAT is possible, wherein the RA preamble message is not transmitted based on determining that transmission of an RF signal based on the second RAT is impossible.

According to various embodiments, the operation method of the electronic device may further include: identifying, based on the first accumulative SAR, a maximum value of transmission power of an RF signal based on the second RAT, wherein the RA preamble message is not transmitted, based on a maximum value of transmission power of an RF signal based on the second RAT.

According to various embodiments, the RA preamble message may not be transmitted based on a normal transmission power configured for a random access channel (RACH) based on the second RAT being greater than a threshold value and a maximum value of transmission power of an RF signal based on the second RAT.

According to various embodiments, an electronic device may include: at least one processor, wherein the at least one processor is configured to: receive at least one radio resource control (RRC) reconfiguration message including a channel measurement configuration for a second radio access technology (RAT) different from a first RAT while being connected to a first cell based on the first RAT, identify, based on the channel measurement configuration, a measurement object for the second RAT and a reporting criterion corresponding to the measurement object, identify a first accumulative specific absorption rate (SAR) having occurred based on transmission of at least one RF signal based on the first RAT and/or the second RAT for a first time interval, and determine, based on the first accumulative SAR, whether to perform a measurement of the measurement object and/or a report of a measurement result of the measurement object.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration.

According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
at least one processor, and
memory storing instructions which, when executed by the at least one processor individually or collectively, cause the electronic device to:
while being connected to a first cell based on a first radio access technology (RAT), receive, at a first point in time, at least one message causing a random access (RA) procedure for a second cell based on a second radio access technology (RAT) different from a first RAT to perform a dual-connectivity of the first cell and the second cell,
identify, based on the reception of the at least one message, a first accumulative specific absorption rate (SAR) having occurred based on transmission of at least one radio frequency (RF) signal based on the first RAT and/or the second RAT for a first time interval before the first point in time,
transmit an RA preamble message to the second cell based on determining, based on the first accumulative SAR, that performing the RA procedure for the second cell to perform the dual-connectivity of the first cell and the second cell is possible, and
refrain from transmitting the RA preamble message based on determining, based on the first accumulative SAR, that performing the RA procedure for the second cell to perform the dual-connectivity of the first cell and the second cell is impossible.

2. The electronic device of claim 1, wherein the instructions, when executed by the at least one processor individually or collectively, cause the electronic device to:
receive at least one radio resource control (RRC) reconfiguration message of a secondary cell group (SCG) addition configuration associated with the second cell, as at least a part of an operation of receiving at the first point in time at least one message causing an RA procedure for the second cell based on the second RAT, and
identify the first accumulative SAR having occurred based on transmission of at least one RF signal based on the first RAT, as at least a part of operation of identifying the first accumulative SAR having occurred based on transmission of at least one RF signal based on the first RAT and/or the second RAT for the first time interval before the first point in time.

3. The electronic device of claim 1, wherein the instructions, when executed by the at least one processor individually or collectively, cause the electronic device to:
receive an SpCell change command or a handover command for a change from a third cell based on the second RAT to the second cell while being connected to the first cell and the third cell, as at least a part of an operation of receiving at the first point in time at least one message causing an RA procedure for the second cell based on the second RAT, and
identify the first accumulative SAR having occurred based on transmission of at least one first RF signal based on the first RAT and transmission of at least one second RF signal based on the second RAT, as at least a part of an operation of identifying the first accumulative SAR having occurred based on transmission of at least one RF signal based on the first RAT and/or the second RAT for the first time interval before the first point in time.

4. The electronic device of claim 1, wherein the instructions, when executed by the at least one processor individually or collectively, cause the electronic device to:
determine, based on the first accumulative SAR, whether transmission of an RF signal based on the second RAT is possible, and
refrain from transmitting the RA preamble message, based on determining that transmission of an RF signal based on the second RAT is impossible, as at least a part of an operation of refraining from transmitting the RA preamble message based on determining that performing the RA procedure for the second cell based on the second RAT is impossible.

5. The electronic device of claim 4, wherein the instructions, when executed by the at least one processor individually or collectively, cause the electronic device to, as at least a part of an operation of determining, based on the first accumulative SAR, whether transmission of an RF signal based on the second RAT is possible:
identify a first value obtained by subtracting the first accumulative SAR from an accumulative SAR limit value for the second RAT corresponding to a designated measurement time interval,
identify a second value obtained by multiplying a measurement unit time interval and an SAR occurring based on an RF signal based on the first RAT being transmitted with a normal transmission power,
identify a third value obtained by multiplying a value obtained by subtracting the measurement unit time interval from a remaining time interval obtained by subtracting a counting time interval of the first accumulative SAR from the designated measurement time interval, and an SAR occurring based on an RF signal based on the first RAT being transmitted with a backed-off transmission power, and
determine that transmission of an RF signal based on the second RAT is impossible, based on a result of subtracting a sum of the second value and the third value from the first value being less than 0.

6. The electronic device of claim 1, wherein the instructions, when executed by the at least one processor individually or collectively, cause the electronic device to:
identify, based on the first accumulative SAR, a maximum value of transmission power of an RF signal based on the second RAT, and
refrain from transmitting the RA preamble message, based on the maximum value of transmission power of an RF signal based on the second RAT, as at least a part of an operation of refraining from transmitting the RA preamble message based on determining that performing the RA procedure for the second cell based on the second RAT is impossible.

7. The electronic device of claim 6, wherein the instructions, when executed by the at least one processor individually or collectively, cause the electronic device to, as at least a part of an operation of refraining from transmitting the RA preamble message, based on a maximum value of transmission power of an RF signal based on the second RAT:
identify a normal transmission power configured for a random access channel (RACH) based on the second RAT, and
refrain from transmitting the RA preamble message based on the normal transmission power being greater than a threshold value and a maximum value of transmission power of an RF signal based on the second RAT.

8. The electronic device of claim 6, wherein the instructions, when executed by the at least one processor individually or collectively, cause the electronic device to, as at least a part of an operation of refraining from transmitting the RA preamble message, based on a maximum value of transmission power of an RF signal based on the second RAT:
refrain from transmitting the RA preamble message, based on a maximum value of transmission power of an RF signal based on the second RAT being determined to be a backed-off transmission power.

9. The electronic device of claim 1, wherein the instructions, when executed by the at least one processor individually or collectively, cause the electronic device to:
identify, based on the first accumulative SAR, a maximum value of transmission power of an RF signal based on the second RAT, and
identify a maintainable time interval for which a maximum value of transmission power of an RF signal based on the second RAT can be maintained, and
refrain from transmitting the RA preamble message, based on the maintainable time interval being less than a designated time interval, as at least a part of an operation of refraining from transmitting the RA preamble message based on determining that performing the RA procedure for the second cell based on the second RAT is impossible.

10. The electronic device of claim 1, wherein the instructions, when executed by the at least one processor individually or collectively, cause the electronic device to:
identify a first value obtained by subtracting the first accumulative SAR from an accumulative SAR limit value for the first RAT corresponding to a designated measurement time interval, and
identify a second value obtained by subtracting the first accumulative SAR from an accumulative SAR limit value for the second RAT corresponding to the designated measurement time interval, and
refrain from transmitting the RA preamble message, based on a ratio between the first value and the second value, as at least a part of an operation of refraining from transmitting the RA preamble message based on determining that performing the RA procedure for the second cell based on the second RAT is impossible.

11. The electronic device of claim 1, wherein the instructions, when executed by the at least one processor individually or collectively, cause the electronic device to: based on the RA preamble message not being transmitted, transmit the RA preamble message, based on passage of a designated time interval from a time point of not transmitting the RA preamble message.

12. The electronic device of claim 1, wherein the instructions, when executed by the at least one processor individually or collectively, cause the electronic device to:
identify, based on the first accumulative SAR, a maximum value of transmission power of an RF signal based on the first RAT, and
refrain from transmitting the RA preamble message, based on a maximum value of transmission power of an RF signal based on the first RAT, as at least a part of an operation of refraining from transmitting the RA preamble message based on determining that performing the RA procedure for the second cell based on the second RAT is impossible.

13. A method of operating an electronic device, the method comprising:
while being connected to a first cell based on a first radio access technology (RAT), receiving, at a first point in time, at least one message causing a random access (RA) procedure for a second cell based on a second radio access technology (RAT) different from the first RAT to perform a dual-connectivity of the first cell and the second cell;
identifying, based on the reception of the at least one message, a first accumulative specific absorption rate (SAR) having occurred based on transmission of at least one radio frequency (RF) signal based on the first RAT and/or the second RAT for a first time interval before the first point in time; and
transmitting an RA preamble message to the second cell based on determining, based on the first accumulative SAR, that performing the RA procedure for the second cell to perform the dual-connectivity of the first cell and the second cell is possible,
wherein the RA preamble message is not transmitted based on determining, based on the first accumulative SAR, that performing the RA procedure for the second cell to perform the dual-connectivity of the first cell and the second cell is impossible.

14. The method of claim 13, wherein the receiving of at least one message at the first point in time causing an RA procedure for the second cell based on the second RAT comprises: receiving at least one radio resource control (RRC) reconfiguration message of a secondary cell group (SCG) addition configuration associated with the second cell, and
the identifying of the first accumulative SAR having occurred based on transmission of at least one RF signal based on the first RAT and/or the second RAT for the first time interval comprises before the first point in time: identifying the first accumulative SAR having occurred based on transmission of at least one RF signal based on the first RAT.

15. The method of claim 13, wherein the receiving of at least one message at the first point in time causing an RA procedure for the second cell based on the second RAT comprises: receiving an SpCell change command or a handover command for a change from a third cell based on the second RAT to the second cell while being connected to the first cell and the third cell, and
the identifying of the first accumulative SAR having occurred based on transmission of at least one RF signal based on the first RAT and/or the second RAT for the first time interval before the first point in time comprises: identifying the first accumulative SAR having occurred based on transmission of at least one first RF signal based on the first RAT and transmission of at least one second RF signal based on the second RAT.

16. The method of claim 13, further comprising determining, based on the first accumulative SAR, whether transmission of an RF signal based on the second RAT is possible,
wherein the RA preamble message is not transmitted based on determination that transmission of an RF signal based on the second RAT is impossible.

17. The method of claim 16, wherein the determining of whether transmission of an RF signal based on the second RAT is possible, based on the first accumulative SAR, comprises:
identifying a first value obtained by subtracting the first accumulative SAR from an accumulative SAR limit value for the second RAT, which corresponds to a designated measurement time interval;

identifying a second value obtained by multiplying a measurement unit time interval and an SAR occurring when an RF signal based on the first RAT is transmitted with a normal transmission power;

identifying a third value obtained by multiplying a value obtained by subtracting the measurement unit time interval from a remaining time interval obtained by subtracting a counting time interval of the first accumulative SAR from the designated measurement time interval, and an SAR occurring when an RF signal based on the first RAT is transmitted with a backed-off transmission power; and determining that transmission of an RF signal based on the second RAT is impossible, based on that a result of subtracting a sum of the second value and the third value from the first value is smaller than 0.

18. The method of claim 13, further comprising identifying, based on the first accumulative SAR, a maximum value of transmission power of an RF signal based on the second RAT, wherein the RA preamble message is not transmitted, based on a maximum value of transmission power of an RF signal based on the second RAT.

19. The method of claim 18, wherein the RA preamble message is not transmitted when a normal transmission power configured for an RACH based on the second RAT is greater than a threshold value and a maximum value of transmission power of an RF signal based on the second RAT.

* * * * *